(12) United States Patent
Yi et al.

(10) Patent No.: US 11,989,350 B2
(45) Date of Patent: May 21, 2024

(54) HAND KEY POINT RECOGNITION MODEL TRAINING METHOD, HAND KEY POINT RECOGNITION METHOD AND DEVICE

(71) Applicant: TENCENT TECHNOLOGY (SHENZHEN) COMPANY LIMITED, Shenzhen (CN)

(72) Inventors: Yang Yi, Shenzhen (CN); Shijie Zhao, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 931 days.

(21) Appl. No.: 17/000,844

(22) Filed: Aug. 24, 2020

(65) Prior Publication Data

US 2020/0387698 A1 Dec. 10, 2020

Related U.S. Application Data

(63) Continuation of application No. PCT/CN2019/090542, filed on Jun. 10, 2019.

(30) Foreign Application Priority Data

Jul. 10, 2018 (CN) .......................... 201810752953.1

(51) Int. Cl.
*G06F 3/01* (2006.01)
*G06F 18/214* (2023.01)
(Continued)

(52) U.S. Cl.
CPC ............ *G06F 3/017* (2013.01); *G06F 18/214* (2023.01); *G06N 3/08* (2013.01); *G06T 7/143* (2017.01);
(Continued)

(58) Field of Classification Search
CPC ......... G06F 3/017; G06F 18/214; G06N 3/08; G06T 7/143; G06T 7/174; G06V 10/454; G06V 10/764; G06V 10/82
See application file for complete search history.

(56) References Cited

U.S. PATENT DOCUMENTS

2017/0206405 A1\* 7/2017 Molchanov ............ G06N 3/044
2019/0213444 A1 7/2019 Zheng et al.

FOREIGN PATENT DOCUMENTS

| CN | 108133220 A | 6/2018 |
| CN | 108230232 A | 6/2018 |
| KR | 20170137350 A | 12/2017 |

OTHER PUBLICATIONS

Di Franziska Mueller et al: "GANerated Hands for Real-time 3D Hand Tracking from Monocular RGB", arxiv.org, Cornell University Library, 201 Olin Library Cornell University Ffhaca, NY 14858, Dec. 4, 2017 {Dec. 4, 2017} (Year: 2017).\*
(Continued)

*Primary Examiner* — Cao H Nguyen
(74) *Attorney, Agent, or Firm* — ANOVA LAW GROUP, PLLC

(57) ABSTRACT

A hand key-point recognition model training method is provided for a model training device. The method includes: converting a sample virtual image into an emulation image through a Cycle-GAN model, the sample virtual image being an image generated through three-dimensional modeling, and the sample virtual image including key-point coordinates corresponding to hand key-points, and the emulation image being used for emulating an image acquired in a real scenario; extracting a hand image in the emulation image; and training a hand key-point recognition model according to the hand image in the emulation image and the key-point coordinates, the hand key-point recognition model
(Continued)

being used for outputting hand key-point coordinates of a hand in a real image according to the inputted real image.

20 Claims, 11 Drawing Sheets

(51) Int. Cl.
  *G06N 3/08* (2023.01)
  *G06T 7/143* (2017.01)
  *G06T 7/174* (2017.01)
  *G06V 10/44* (2022.01)
  *G06V 10/764* (2022.01)
  *G06V 10/82* (2022.01)
  *G06V 40/10* (2022.01)
  *G06V 40/20* (2022.01)

(52) U.S. Cl.
  CPC ............ *G06T 7/174* (2017.01); *G06V 10/454* (2022.01); *G06V 10/764* (2022.01); *G06V 10/82* (2022.01); *G06V 40/107* (2022.01); *G06V 40/28* (2022.01)

(56) References Cited

OTHER PUBLICATIONS

Ronneberger Olaf et al: "U-Net: Convolutional Networks for Biomedical Image Segmentation", Nov. 18, 2015 (Nov. 18, 2015), : International Conference on Image Analysis and Processing, 17th International Conference, Naples, Italy. Sep. 9-13, 2013. Proceedings: (Year: 2013).*

The European Patent Office (EPO) Office Action 1 for for 19833424.5 dated Jul. 15, 2021 13 Pages (including translation).

Franziska Mueller et al "GANerated Hands for Real-time 30 Hand Tracking from Monocular RGB," arXiv:1712.01057, Dec. 4, 2017 (Dec. 4, 2017). 13 pages.

Jun-Yan Zhu et al "Unpaired Image-to-Image Translation Using Cycle-Consistent Adversarial Networks," 2017 IEEE International Conference on Computer Vision (ICCV), IEEE, Oct. 22, 2017 (Oct. 22, 2017), pp. 2242-2251. 10 pages.

Olaf Ronneberger et al "U-Net: Convolutional Networks for Biomedical Image Segmentation," MICCAI 2015, Nov. 18, 2015 (Nov. 18, 2015), pp. 234-241. 8 pages.

The World Intellectual Property Organization (WIPO) International Search Report for PCT/CN2019/090542 dated Sep. 19, 2019 5 Pages (including translation).

Jianhua He et al., "Unpaired Image-to-Image Translation Using Improved Cycle-consistent Adversarial Networks," Journal of Yulin Normal University (Natural Science), vol. 39, No. 2, Apr. 30, 2018 (Apr. 30, 2018). 6 Pages.

C Zimmermann et al., "Learning to Estimate 3D Hand Pose From Single RGB Images," Proceedings of the IEEE International Conference on Computer Vision (ICCV), 2017, pp. 4903-4911 9 Pages.

* cited by examiner

HAND KEY POINT RECOGNITION MODEL TRAINING METHOD, HAND KEY POINT RECOGNITION METHOD AND DEVICE

RELATED APPLICATIONS

This application is a continuation application of PCT Patent Application No. PCT/CN2019/090542, filed on Jun. 10, 2019, which claims priority to Chinese Patent Application No. 201810752953.1, entitled "HAND KEY POINT RECOGNITION MODEL TRAINING METHOD, HAND KEY POINT RECOGNITION METHOD AND DEVICE" and filed with the National Intellectual Property Administration, PRC on Jul. 10, 2018, both of which are incorporated herein by reference in their entirety.

FIELD OF THE TECHNOLOGY

The present disclosure relates to the field of gesture recognition technologies and, in particular, to a hand key-point recognition model training method, a hand key-point recognition method and device.

BACKGROUND

As the artificial intelligence technology matures continuously, more application scenarios begin to support man-machine interaction, and gesture interaction is a common man-machine interaction.

The key to gesture interaction lies in the recognition of hand key-points. In a hand key-point recognition method, the developer first builds a virtual three-dimensional model of a hand through a computer, and uses a virtual image of the virtual three-dimensional model and three-dimensional coordinates data corresponding to the hand key-points as training samples to train the hand key-point recognition model. In the subsequent gesture recognition, a real image including a gesture acquired by a camera is inputted into the hand key-point recognition model, and then three-dimensional coordinates of each hand key-point in the real image may be obtained, so as to recognize the gesture.

However, when using the above method for gesture recognition, there are great differences between details of the virtual image and details of the real image, for example, the skin and background of the hand in the virtual image are different from those in the real image. Therefore, the accuracy of gesture recognition by using the recognition model trained based on the virtual image is relatively low, which affects the accuracy of gesture interaction. The disclosed methods and systems are directed to solve one or more problems set forth above and other problems.

SUMMARY

Embodiments of the present disclosure provide a hand key-point recognition model training method, a hand key-point recognition method and device.

An aspect of the present disclosure includes a hand key-point recognition model training method for a model training device. The method includes converting a sample virtual image into an emulation image by using a Cycle-GAN model, the sample virtual image being an image generated through three-dimensional modeling, the sample virtual image comprising key-point coordinates corresponding to hand key-points, and the emulation image being used for emulating an image acquired in a real scenario; extracting a hand image in the emulation image; and training a hand key-point recognition model according to the hand image in the emulation image and the key-point coordinates, the hand key-point recognition model being used for outputting hand key-point coordinates of a hand in a real image according to the inputted real image.

Another aspect of the present disclosure includes a hand key-point recognition method provided for a hand key-point recognition device. The method includes acquiring a real image, the real image comprising a hand image; extracting the hand image in the real image; and inputting the hand image into a hand key-point recognition model, to obtain hand key-point coordinates. The hand key-point recognition model is obtained by training according to an emulation image and three-dimensional label data of a hand image in the emulation image, the emulation image being generated by a Cycle-GAN model according to a sample virtual image, the Cycle-GAN model being generated according to a sample real image and the sample virtual image, the sample virtual image being an image generated through three-dimensional modeling, and the sample virtual image comprising key-point coordinates corresponding to hand key-points.

Another aspect of the present disclosure includes a model training device. The model training device include a memory storing computer program instructions, and a processor coupled to the memory. When executing the computer program instructions, the processor is configured to perform: converting a sample virtual image into an emulation image by using a Cycle-GAN model, the sample virtual image being an image generated through three-dimensional modeling, the sample virtual image comprising key-point coordinates corresponding to hand key-points, and the emulation image being used for emulating an image acquired in a real scenario; extracting a hand image in the emulation image; and training a hand key-point recognition model according to the hand image in the emulation image and the key-point coordinates, the hand key-point recognition model being used for outputting hand key-point coordinates of a hand in a real image according to the inputted real image.

Details of one or more embodiments of the present disclosure are provided in the accompany drawings and descriptions below. Other features, objectives, and advantages of the present disclosure will become apparent from the specification, the accompanying drawings, and the claims.

BRIEF DESCRIPTION OF THE DRAWINGS

To describe the embodiments of the present disclosure more clearly, the following briefly describes the accompanying drawings required for describing the embodiments. Apparently, the accompanying drawings in the following description show only some embodiments of the present disclosure, and a person of ordinary skill in the art may derive other accompanying drawings from these accompanying drawings without creative efforts.

DETAILED DESCRIPTION

Figure 1:
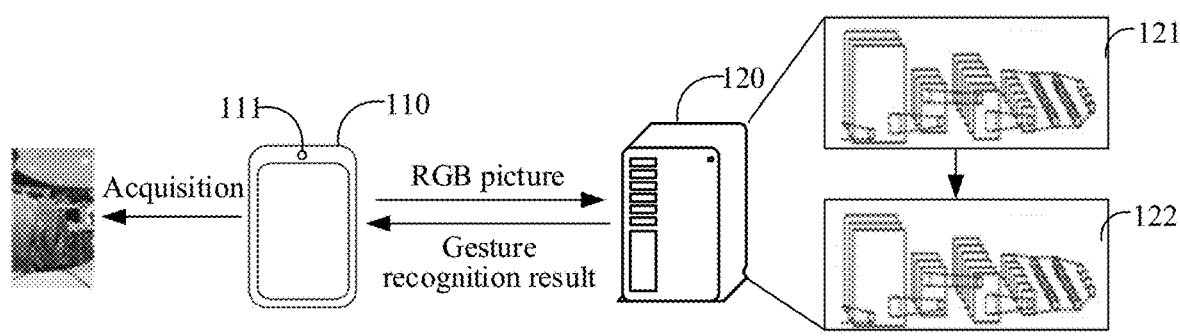
FIG. 1 is a schematic diagram of an implementation environment according to an embodiment of the present disclosure.

To make the objectives, technical solutions, and advantages of the present disclosure clearer, the following further describes implementations of the present disclosure in detail with reference to the accompanying drawings. To facilitate understanding, the following explains terms involved in the embodiments of the present disclosure.

Cycle-GAN model: The cycle generative adversarial networks (Cycle-GAN) model is a deep learning model configured to convert data from an original data domain into a target data domain, and may be configured to convert a style of an image. For example, the Cycle-GAN model may be configured to output a cartoon picture (picture cartoonization) according to an inputted picture, or configured to convert an object A in an inputted picture into an object B (for example, converting a cat into a dog). The Cycle-GAN model in the embodiments of the present disclosure is configured to convert a virtual image into a real image, or convert a real image into a virtual image. The virtual image is generated through computer modeling, and carries key-point coordinates.

The Cycle-GAN model is formed by a generator and a discriminator, the generator is configured to convert a style of an image, and the discriminator is configured to discriminate an original image from an image outputted by the generator.

Convolution layer: the convolution layer is a layer for feature extraction in a convolutional neural network, and is configured to extract low-dimensional features from high-dimensional data, the feature extraction including three parts: a convolution operation, an activation operation, and a pooling operation. During the convolution operation, a convolution kernel obtained by training and learning in advance is used for feature extraction; during the activation operation, activation processing is performed, by using an activation function, on a feature map obtained through convolution. Common activation functions include a rectified linear unit (ReLU) function, a Sigmoid (S) function, and a Tan h function. After processing by the convolution and activation layer, a feature vector outputted by the convolution and the activation is reduced through the pooling operation (that is, a size of the feature map is reduced), while an overfitting problem is alleviated. Common pooling manners include mean-pooling, max-pooling, and stochastic-pooling.

Deconvolution layer: The deconvolution layer has a function opposite to that of the convolution layer, and the deconvolution layer is used for mapping low-dimensional features to be high-dimensional outputs. In the embodiments of the present disclosure, the deconvolution layer is a layer used for up-sampling the feature vector, that is, increasing the size of the feature map.

Splicing: In the embodiments of the present disclosure, the splicing refers to a process of fusing two multi-channel feature maps of the same size, a number of channels of a spliced feature map is equal to a total number of channels of the two feature maps before splicing.

Residual layer: The residual layer is a layer structure used for feature extraction through a residual network (ResNet) structure. In the embodiments of the present disclosure, the residual layer is used for feature extraction on an extracted hand image, to determine a key-point in the hand image.

Fully connected layer: The fully connected layer is also referred to as an inner product layer. In the convolutional neural network, after the feature extraction, the picture is mapped to a feature space of a hidden layer, and the fully connected layer is used for mapping the feature obtained through learning and training to a sample classification space.

FIG. 1 is a schematic diagram of an implementation environment according to an embodiment of the present disclosure. The implementation environment includes at least one terminal 110 and a server 120.

The terminal 110 is an electronic device having an image acquisition function, and the electronic device may be a smartphone, a tablet computer, a motion sensing game device, a personal computer, or the like that is equipped with a camera. For example, as shown in FIG. 1, when the terminal 110 is a mobile phone equipped with a camera 111, the camera 111 may be a front-facing camera (located at one side of a screen of the mobile phone) or a rear-facing camera (located at a back side of the screen of the mobile phone).

In a possible use scenario, when a preset application program (supporting a gesture interaction function) is started, the terminal 110 acquires a red green blue (RGB)

picture through the camera, or acquires, through the camera, a video formed by consecutive RGB picture frames. For example, when a motion sensing game supporting the gesture interaction is started, the terminal 110 starts the camera for image acquisition.

The terminal 110 and the server 120 are connected through a wired network or a wireless network.

The server 120 may be one server, a server cluster formed by several servers, or a cloud computing center. In a possible implementation, the server 120 is a backend server of a preset application in the terminal 110.

In a possible application scenario, as shown in FIG. 1, after acquiring the RGB picture by using the camera 111, the terminal 110 transmits the RGB picture to the server 120. The server 120 extracts a hand image in the RGB picture through a pre-trained gesture segmentation neural network 121, and recognizes key-point coordinates of hand key-points in the hand image through a pre-trained hand key-point recognition model 122, so as to determine a gesture indicated by the hand image according to the key point coordinates, and feed a gesture recognition result back to the terminal 110.

In another possible application scenario, when the terminal 110 is provided with a gesture recognition function, for the acquired RGB picture, the terminal 110 performs hand image extraction and hand key-point recognition locally without relying on the server 120.

Optionally, the terminal 110 or the server 120 implements the gesture recognition function through a neural network chip.

Optionally, the wireless network or wired network uses a standard communications technology and/or protocol. The network is generally the Internet, but may be any other network, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as hypertext markup language (HTML) and extensible markup language (XML) are used for representing data exchanged through a network. In addition, all or some links may be encrypted by using conventional encryption technologies such as a secure socket layer (SSL), transport layer security (TLS), a virtual private network (VPN), and Internet Protocol security (IPsec). In some other embodiments, custom and/or dedicated data communications technologies may also be used in place of or in addition to the foregoing data communications technologies.

The hand key-point recognition model training method provided in the embodiments of the present disclosure may be performed by a model training device, the model training device may be a computer or a server having relatively strong computing capability; the hand key-point recognition method provided in the embodiments of the present disclosure may be performed by a hand key-point recognition device, and the hand key-point recognition device may be the terminal 110 or the server 120 in FIG. 1.

Three-dimensional gesture recognition based on the RGB picture means to determine hand key-points in a two-dimensional RGB picture, and further obtain three-dimensional coordinates of each hand key-point. In the related art, a hand key-point recognition model based on a deep neural network is generally used for hand key-point recognition. However, in the training stage of the hand key-point recognition model, a large number of RGB pictures carrying label information (coordinates of hand key-points) need to be used as training samples, and a large number of sensing devices are required to acquire hand key-point coordinates in a real scenario. Therefore, it is relatively difficult to acquire training samples in the early stage, and consequently, it is relatively difficult to train the hand key-point recognition model.

Figure 2:
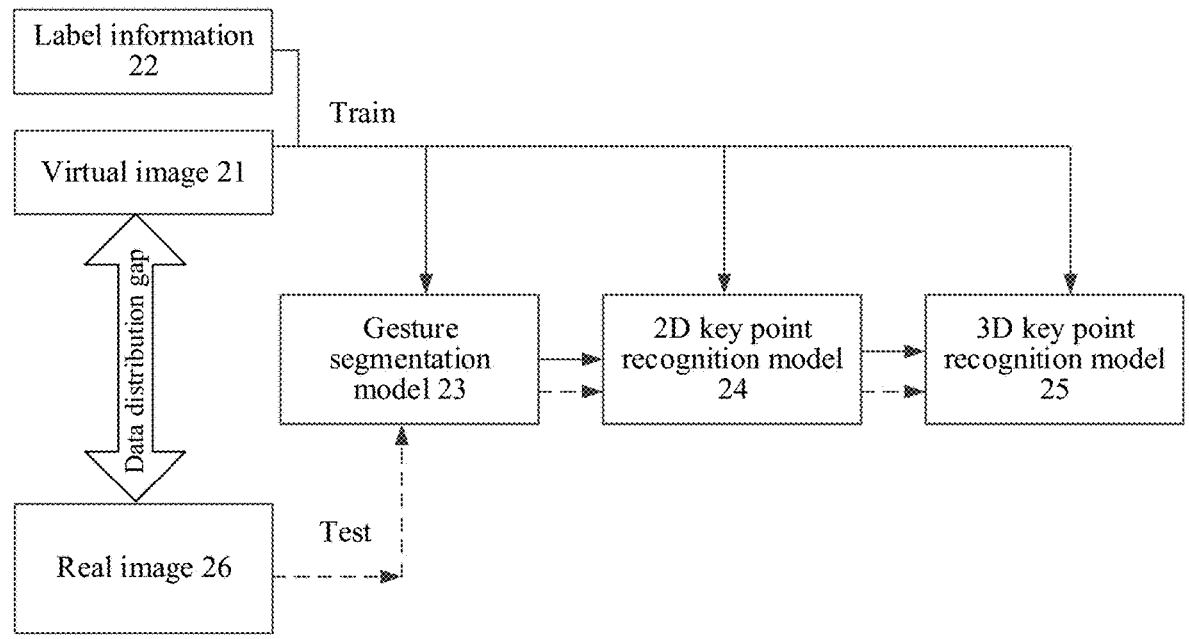
FIG. 2 is a schematic diagram of a principle of training a model according to a virtual image.

A hand key-point recognition model training method is provided to reduce the difficulty of training the hand key-point recognition model. As shown in FIG. 2, in the training method, a three-dimensional hand model is automatically created by using a graphics rendering function of a computer, so that a virtual image 21 and label information 22 (coordinate data generated during modeling automatically) corresponding to the three-dimensional hand model are used as training samples, to train a gesture segmentation model 23 (configured to recognize a hand region in the image), a 2D key-point recognition model 24 (configured to obtain a heatmap of two-dimensional hand key-points in the image), and a 3D key-point recognition model 25 (configured to obtain three-dimensional coordinates of three-dimensional hand key-points in the image).

By adopting the foregoing method, the label information is generated by the computer in the modeling stage automatically, so that the difficulty of obtaining the training sample can be reduced, thereby improving the efficiency of training the model. There is a data distribution gap (there are great differences in details) between a virtual image and a real image acquired in a real scenario, for example, hand skin details and background details in the real image are greatly different from those in the virtual image. Therefore, a test result obtained by testing a model (obtained by training based on virtual images) by using a real image 26 is relatively poor. Moreover, because inputs of the model are all real images in an actual application scenario, the accuracy of recognizing the hand key-points by using the model is relatively low.

Figure 3:
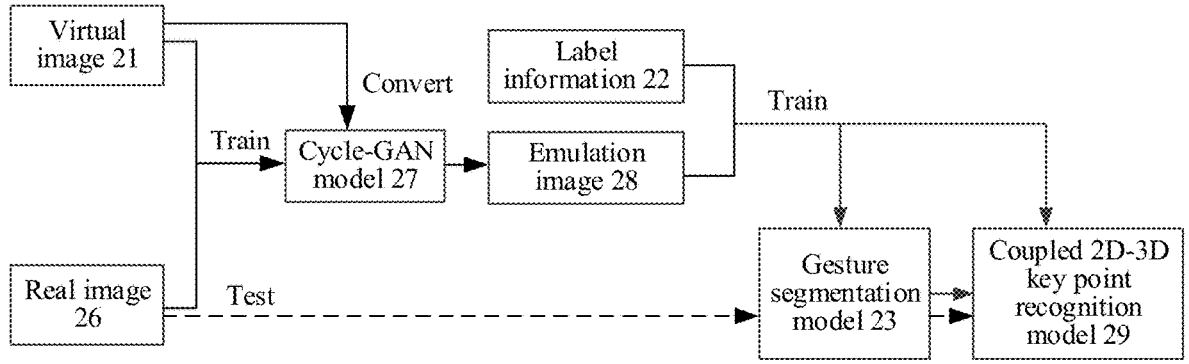
FIG. 3 is a schematic diagram of a principle of a gesture key-point recognition model training process according to an embodiment of the present disclosure.

To resolve the problem caused by the data distribution gap, as shown in FIG. 3, in the hand key-point recognition model training method provided in the embodiments of the present disclosure, a Cycle-GAN model 27 is trained according to the virtual image 21 and the real image 26 in advance, and the virtual image 21 is converted into an emulation image 28 by using the Cycle-GAN model 27, so that the emulation image 28 and corresponding label information 22 are used as the training sample, to train the gesture segmentation model 23; and the 2D key-point recognition model is coupled to the 3D key-point recognition model to form a coupled 2D-3D key-point recognition model 29, thereby improving the accuracy of model output. Data in a virtual scenario domain is transferred to a real scenario data domain by using the Cycle-GAN model 27, so as to alleviate the problem of the data distribution gap, thereby improving the test result of the model for a real image, and improving the accuracy of recognizing the hand key-points in the actual application scenario.

The hand key-point recognition method provided in the embodiments of the present disclosure may be applied to a sign language recognition scenario, a gesture interaction scenario, a hand special effect scenario, and other scenarios related to the gesture recognition. The following is a description with reference to different application scenarios.

Sign language recognition scenario: When the hand key-point recognition method is applied to a sign language recognition scenario, the hand key-point recognition method may be implemented as sign language recognition software, and the sign language recognition software is installed in a terminal. After the terminal starts the sign language recognition software, the terminal acquires a sign language image by using a camera, recognizes the meaning expressed by the sign language image, and presents a recognition result in a form of text, to help a user who does not know the sign language to communicate with the disabled.

Gesture interaction scenario: When the hand key-point recognition method is applied to a gesture interaction scenario, the hand key-point recognition method may be implemented as smart home control software, and the smart home control software is installed in a smart home device supporting gesture control. In a running process of the smart home device, an image including a user gesture is acquired by using a camera, and the gesture is recognized, so as to determine a control instruction corresponding to the user gesture and perform a corresponding operation according to the control instruction, to help a user to rapidly control the smart home device through gestures.

Hand special effect scenario: When the hand key-point recognition method is applied to a hand special effect scenario, the hand key-point recognition method may be implemented as image processing software, and the image processing software is installed in a terminal. After starting the image processing software, the terminal acquires a user hand image by using a camera, and superimposes a hand special effect on corresponding hand key-points according to the hand special effect (for example, an eagle claw or a bear paw) selected by a user, so as to display the hand special effect in real time.

Figure 4:
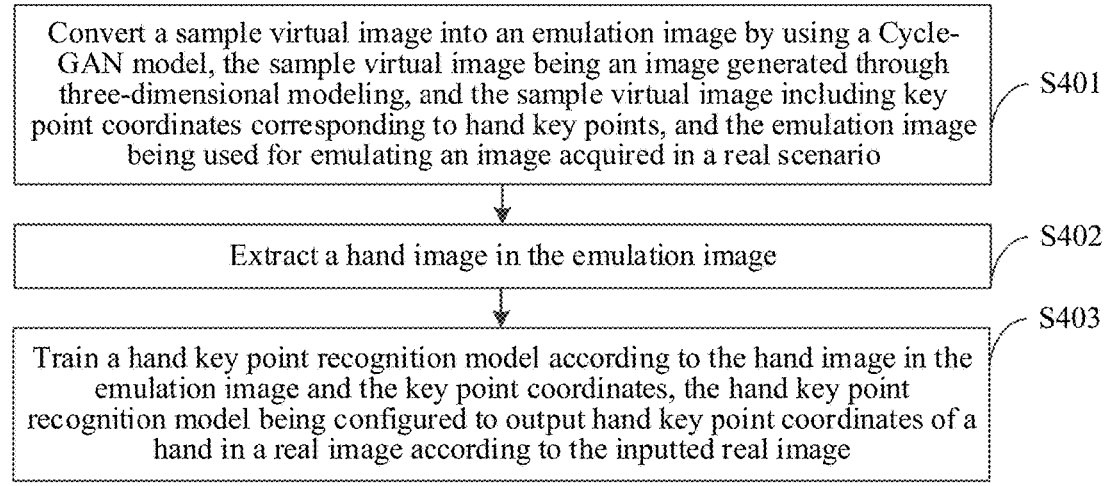
FIG. 4 is a flowchart of a recognition model training method according to an embodiment of the present disclosure.

FIG. 4 is a flowchart of a recognition model training method according to an embodiment of the present disclosure. Using an example in which the hand key-point recognition model training method is applied to a model training device, the method may include the followings.

S401. Convert a sample virtual image into an emulation image by using a Cycle-GAN model, the sample virtual image being an image generated through three-dimensional modeling, the sample virtual image including key-point coordinates corresponding to hand key-points, and the emulation image being used for emulating an image acquired in a real scenario.

Optionally, before converting the image by using the Cycle-GAN model, the model training device trains the Cycle-GAN model according to a sample real image and a sample virtual image.

The sample real image is an RGB picture including a hand image acquired in a real scenario. The sample virtual image is an RGB picture of a three-dimensional hand model in a virtual environment, the three-dimensional hand model is constructed by a computer through three-dimensional modeling in the virtual environment, and the sample virtual image carries key-point coordinates (generated automatically during modeling) of hand key-points in the three-dimensional hand model. The Cycle-GAN model obtained through training is configured to convert a sample virtual image into an emulation image, or convert a real image into a pseudo-virtual image.

Optionally, the hand key-points include a plurality of key points, 21 key points for example, including a fingertip, a distal interphalangeal joint (an interphalangeal joint close to the fingertip), a proximal interphalangeal joint (an interphalangeal joint close to the palm), a metacarpal joint, and the like; the key point coordinates may be three-dimensional coordinates, and/or, two-dimensional coordinates.

It is unnecessary to use image pairs in a one-to-one correspondence during training of the Cycle-GAN model, that is, the sample real images and the sample virtual images are not required to be in a one-to-one correspondence. Therefore, in a possible implementation, the model training device acquires images including gestures in a real scenario as a sample real image set, and adopts existing virtual images carrying label information as a sample virtual image set.

To alleviate the problem of the data distribution gap between the real image and the virtual image, the model training device inputs the sample virtual image into the Cycle-GAN model, to obtain an emulation image outputted by the Cycle-GAN model, thereby transferring data in a data domain in the virtual scenario into a data domain in the real scenario.

After the style of the sample virtual image is converted to obtain the emulation image, the key point coordinates corresponding to the sample virtual image are still retained.

S402. Extract a hand image in the emulation image.

Because the sample virtual image may further include a body image, a background image, and other interference factors in addition to the hand image, to improve the quality of the constructed model, the model training device further extracts the hand image in the emulation image.

In a possible implementation, the model training device trains a gesture segmentation neural network in advance, and uses the gesture segmentation neural network to extract the hand image in the emulation image. The gesture segmentation neural network may be generated by training according to a plurality of real images storing label information (labeled with hand regions and non-hand regions).

S403. Train a hand key-point recognition model according to the hand image in the emulation image and the key-point coordinates, the hand key-point recognition model being used for outputting hand key-point coordinates of a hand in a real image according to the inputted real image.

Further, the model training device uses the extracted hand image and the corresponding key-point coordinates as a training sample, to train the hand key-point recognition model. The emulation image used as the training sample and the real image have the same style (belong to the same data domain). Therefore, the accuracy of testing the hand key-point recognition model by using a real image is higher, and the accuracy of recognizing a gesture in a real image by using the hand key-point recognition model is higher.

In a possible implementation, the hand key-point recognition model includes a two-dimensional recognition branch and a three-dimensional recognition branch. After the acquired real image is inputted into the hand key-point recognition model, a two-dimensional key-point heatmap outputted by the two-dimensional recognition branch is obtained (a point with a high response in the heatmap is a two-dimensional key-point), and three-dimensional key-point coordinates outputted by the three-dimensional recognition branch is obtained.

Accordingly, a sample virtual image is converted into an emulation image by using a Cycle-GAN model, so as to train a hand key-point recognition model according to a hand image in the emulation image and key-point coordinates. The emulation image obtained through conversion by the Cycle-GAN model can emulate a style of a sample real image, that is, a training sample is more similar to the acquired real image. Therefore, subsequent gesture recognition for a real image by using the hand key-point recognition model has higher accuracy. Moreover, the hand key-point recognition model is trained based on the sample virtual image carrying the key-point coordinates, thereby avoiding manual labeling of the key-point coordinates, and further improving the efficiency and accuracy of the model training.

The training the Cycle-GAN model includes trainings of a generator and a discriminator. The generator is configured to convert a style of an image, and the discriminator is configured to discriminate an original image and an image outputted by the generator, and the training of the Cycle-GAN model is a process in which the generator and discriminator fight against each other, so as to enable a style of an image outputted by the generator is consistent with a style of a target image (the output approximates a target distribution), and the discriminator is in a random discrimination state (discrimination probabilities of the original image and the image outputted by the generator are equal). The training process of the Cycle-GAN model is described in the following by using a schematic embodiment.

Figure 5:
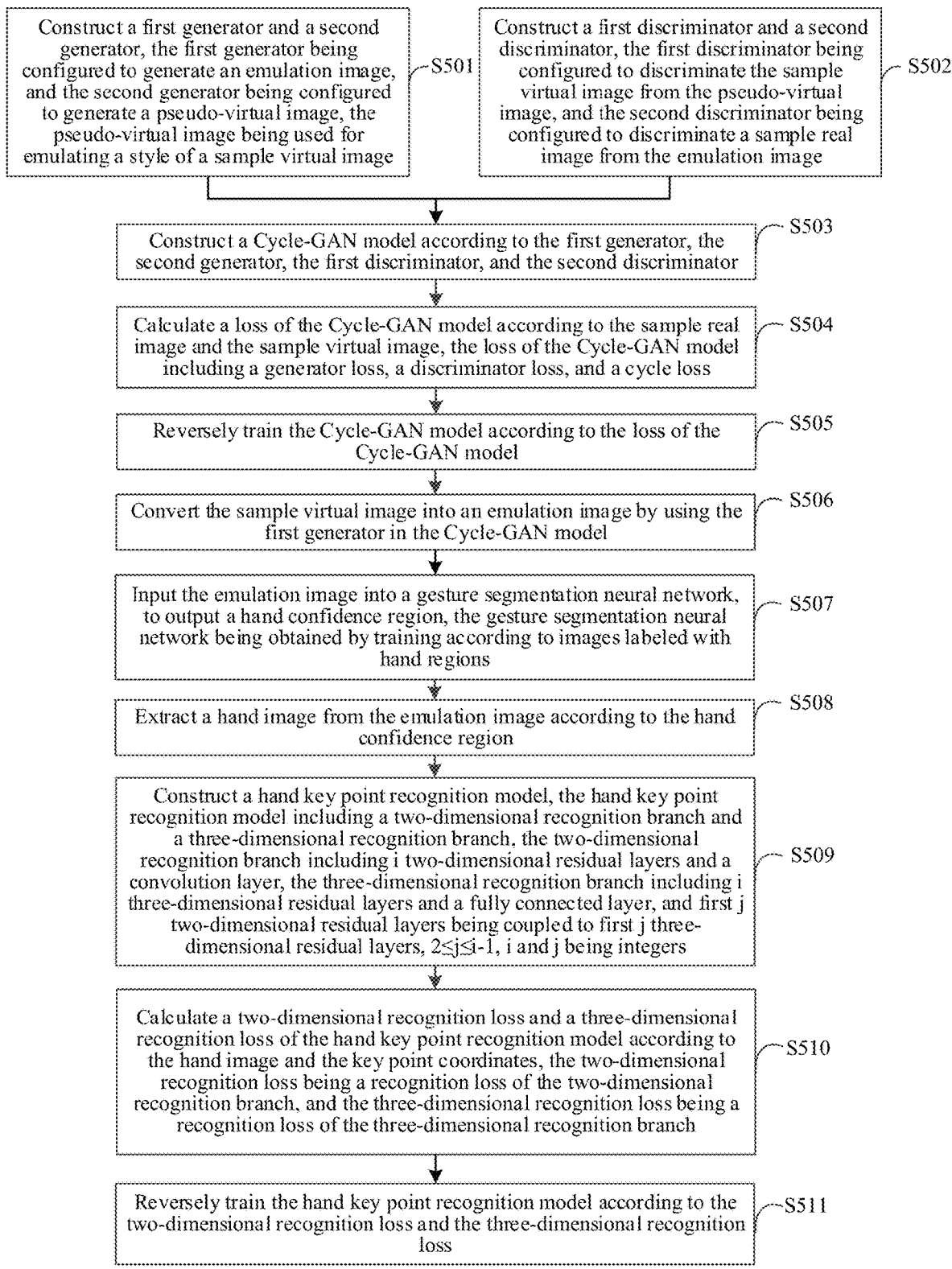
FIG. 5 is a flowchart of a recognition model training method according to another embodiment of the present disclosure.

FIG. 5 is a flowchart of a recognition model training method according to another embodiment of the present disclosure. Using an example in which the hand key-point recognition model training method is applied to a model training device, the method may include the followings.

S501. Construct a first generator and a second generator, the first generator being configured to generate an emulation image, and the second generator being configured to generate a pseudo-virtual image, the pseudo-virtual image being used for emulating a style of a sample virtual image.

A generative training part of the Cycle-GAN model is completed by the generator. The Cycle-GAN model in one embodiment of the present disclosure is configured to convert a style of an image. The Cycle-GAN model includes two generators: the first generator configured to generate an emulation image according to an input image, and the second generator configured to generate a pseudo-virtual image according to an input image. The input image of the first generator is a (original) virtual image or the pseudo-virtual image outputted by the second generator, and the input image of the second generator is a (original) real image or the emulation image outputted by the first generator.

Figure 6:
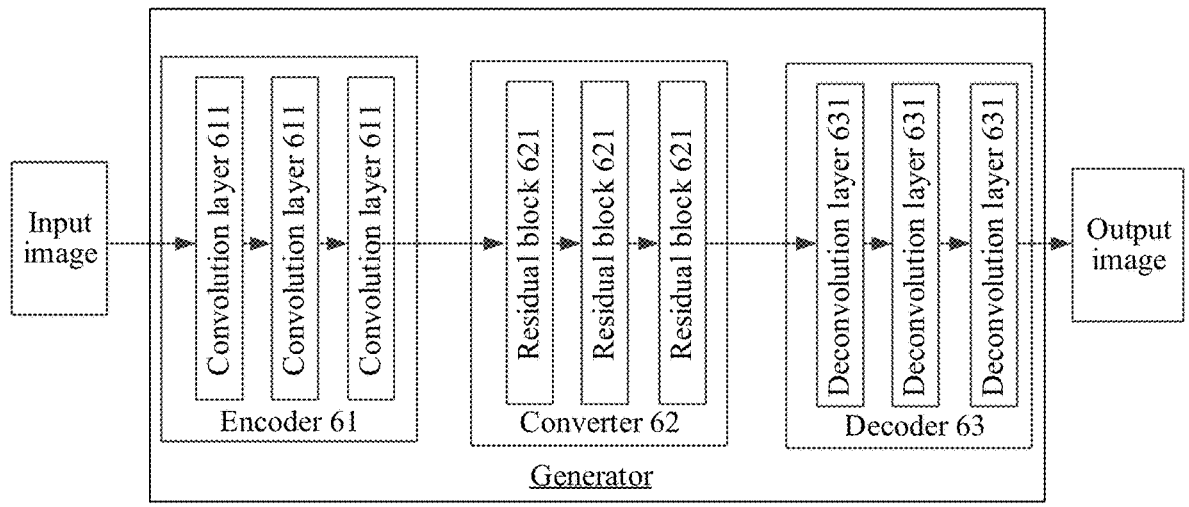
FIG. 6 is a schematic structural diagram of a generator in a Cycle-GAN model according to an embodiment of the present disclosure.

In a possible implementation, as shown in FIG. 6, the generator may include three parts: an encoder 61, a converter 62, and a decoder 63.

The encoder 61 includes a plurality of convolution layers 611 (for example, three convolution layers, as shown in the figure) for performing convolution processing on an input image, so as to extract features of the input image. For example, the convolution layers 611 includes a plurality of convolution kernels with a step of 2. Optionally, an activation layer (ReLU) or a batch normalization (BN) layer may be further added after the convolution layer 611. This is not limited in the embodiments of the present disclosure.

After being processed by the encoder 61, the input image is compressed into a plurality of feature vectors of a data domain to which the input image belongs, and subsequently, the converter 62 converts the feature vectors into feature vectors of a data domain to which an output image belongs. For example, when the input image has a size of 256×256×3 (width×height×number of channels), a feature map with a size of 64×64×256 is obtained after the processing of the encoder 61.

The converter 62 is a residual network including a plurality of (for example, three residual blocks, as shown in the figure) residual blocks 621. Optionally, each residual block 621 includes at least two convolution layers, and a part of an input of the residual block 621 is directly added to an output, that is, the output of the residual block 621 includes the input and the output of the convolution layer of the residual block 621. In this case, it is ensured that an input of a previous network layer directly acts on a next network layer, so that the deviation between the corresponding output and the original input is reduced, and features of the original image are retained in the output and in an output result.

In one embodiment of the present disclosure, the converter 62 is configured to convert a data domain of the feature vectors outputted by the encoder 61. An output size and an input size of the converter 62 are the same. For example, the converter 62 converts a feature map (features of the virtual image) with a size of 64×64×256 outputted by the encoder 61, to output a feature map (features of the real image) with a size of 64×64×256, thereby implementing a conversion from a virtual image data domain to a real image data domain.

Reverse to an encoding process, a decoding process is to restore low-level features from feature vectors to finally obtain an image after style conversion. As shown in FIG. 6, the decoder 63 includes a plurality of deconvolution layers 631 (for example, three deconvolution layers, as shown in the figure) used for performing deconvolution processing on the feature vectors outputted by the converter 62, so as to restore low-level features. For example, the deconvolution layer 631 includes a plurality of convolution kernels with a step of ½.

An image finally outputted by the decoder 63 has the same size as an input image. For example, when the input image has a size of 256×256×3, the decoder 63 finally outputs a style-converted image with a size of 256×256×3.

S502. Construct a first discriminator and a second discriminator, the first discriminator being configured to discriminate the sample virtual image from the pseudo-virtual image, and the second discriminator being configured to discriminate a sample real image from the emulation image.

An adversarial training part of the Cycle-GAN model is completed by the discriminator. The Cycle-GAN model in one embodiment of the present disclosure includes two discriminators: the first discriminator configured to discriminate a sample virtual image from a pseudo-virtual image, and the second discriminator configured to discriminate a sample real image from an emulation image. The pseudo-virtual image is generated by the second generator according to a sample image, and the emulation image is generated by the first generator according to a sample virtual image.

Figure 7:
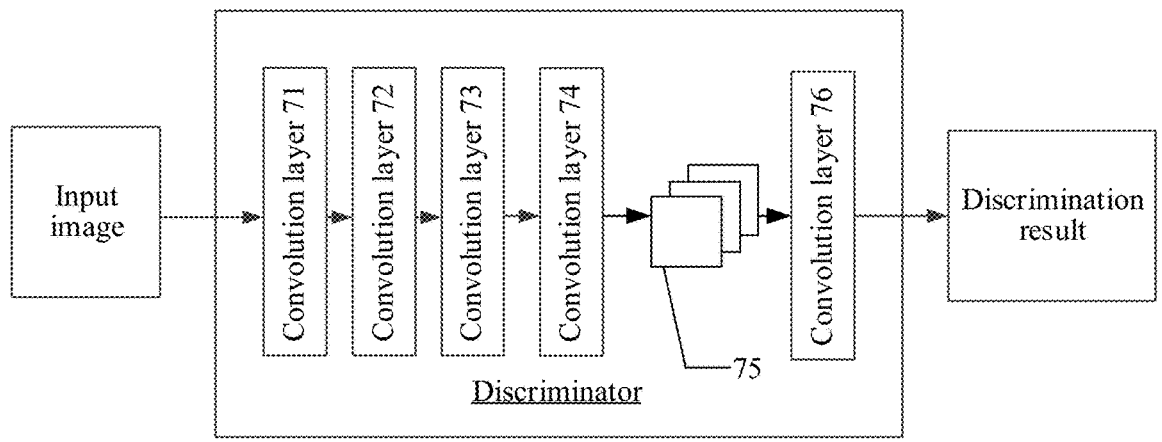
FIG. 7 is a schematic structural diagram of a discriminator in a Cycle-GAN model according to an embodiment of the present disclosure.

The discriminator is in a convolutional neural network structure, and includes a plurality of convolution layers used for image feature extraction and a convolution layer used for generating a one-dimensional output. As shown in FIG. 7, a convolution layer 71, a convolution layer 72, a convolution layer 73, and a convolution layer 74 in the discriminator are used for performing feature extraction on the input image successively, to obtain a feature map 75 of the input image, and the convolution layer 76 is used for generating a one-dimensional output according to the feature map 75, so as to determine, according to the one-dimensional output, whether the input image is a real image or an emulation image, or whether the input image is a virtual image or a pseudo-virtual image.

In a possible implementation, the discriminator in one embodiment of the present disclosure adopts 0/1 discrimination. For example, when an output of the discriminator is 1, it indicates that the input image is a real image, and when an output of the discriminator is 0, it indicates that the input image is an emulation image.

In another possible implementation, the discriminator in one embodiment of the present disclosure does not adopt the 0/1 discrimination; instead, the discriminator divides the input image into a plurality of patch blocks with the same size, and performs discrimination based on the patch blocks. Compared with the 0/1 discrimination, the manner of discrimination based on the patch blocks can reduce the number of parameters for training, thereby improving the training efficiency.

S503. Construct a Cycle-GAN model according to the first generator, the second generator, the first discriminator, and the second discriminator.

Further, the model training device constructs the Cycle-GAN model according to the generator and discriminator obtained through construction in the foregoing steps.

Figure 8:
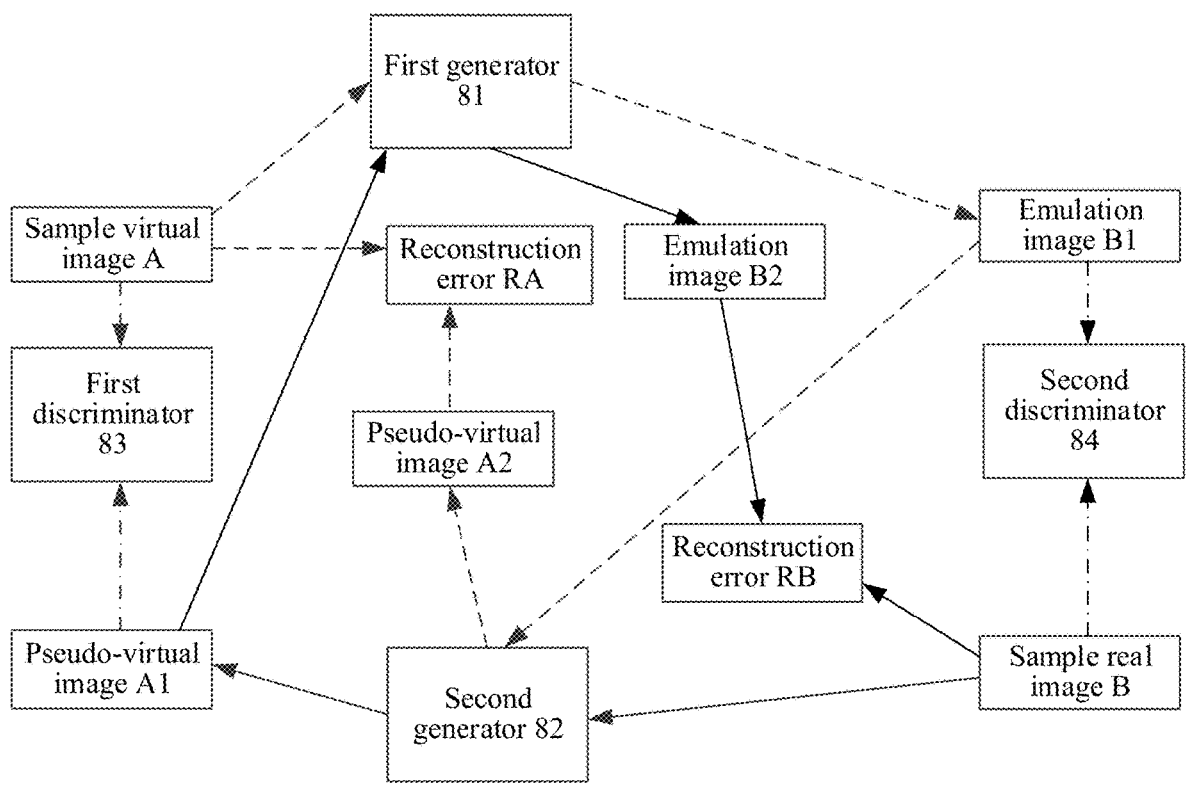
FIG. 8 is a schematic structural diagram of a Cycle-GAN model according to an embodiment of the present disclosure.

For example, the Cycle-GAN model shown in FIG. 8 includes a first generator 81, a second generator 82, a first discriminator 83, and a second discriminator 84.

S504. Calculate a loss of the Cycle-GAN model according to the sample real image and the sample virtual image, the loss of the Cycle-GAN model including a generator loss, a discriminator loss, and a cycle loss.

When training the constructed Cycle-GAN model, the model training device uses the sample virtual image and the sample real image as input images of corresponding generators. The generators convert styles of the input images, and the discriminators discriminate images outputted by the generators and the original input images. A generator loss, a discriminator loss, and a cycle loss are calculated, so as to train the model by using a back propagation algorithm according to the foregoing losses subsequently. The generator loss is a loss generated when the generators convert an image, the discriminator loss is used for indicating an error between a discrimination result of the discriminators and an estimated result, and the cycle loss (or referred to as a cycle consistency loss) is used for indicating a reconstruction error (Reconstruc) between an input image and an output image obtained after conversion performed by the two generators.

The inputted sample real image and sample virtual image are not required to be in a pair, that is, a gesture in the sample real image and a gesture in the sample virtual image are not required to be consistent.

When training the generators in the Cycle-GAN model shown in FIG. 8, the model training device inputs a sample virtual image A into the first generator 81, and the first generator 81 converts the sample virtual image A into an emulation image B1. Further, the first generator 81 inputs the emulation image B1 obtained through conversion into the second generator 82. The second generator 82 converts the emulation image B1 into a pseudo-virtual image A2, and determines a cycle loss by calculating a reconstruction error RA between the sample virtual image A and the pseudo-virtual image A2. The reconstruction error RA is used for indicating an image difference between an image obtained after the style of the sample virtual image A is converted by the two generators and the original sample virtual image A. A smaller reconstruction error RA indicates that the sample virtual image A is more similar to the pseudo-virtual image A2.

The model training device inputs a sample real image B into the second generator 82, and the second generator 82 converts the sample real image B into a pseudo-virtual image A1. Further, the second generator 82 inputs the pseudo-virtual image A1 obtained through conversion into the first generator 81. The first generator 81 converts the pseudo-virtual image A1 into an emulation image B2, and determines a cycle loss by calculating a reconstruction error RB between the sample real image B and the emulation image B2. The reconstruction error RB is used for indicating an image difference between an image obtained after the style of the sample real image B is converted by the two generators and the original sample real image B. A smaller reconstruction error RB indicates that the sample real image B is more similar to the emulation image B2.

When training the discriminators in the Cycle-GAN model shown in FIG. 8, the model training device inputs the sample virtual image A and the pseudo-virtual image A1 into the first discriminator 83, and the first discriminator 83 performs discrimination and calculates a discriminator loss of the first discriminator 83 and a generator loss of the second generator 82 according to an actual discrimination result and a target discrimination result. Similarly, the model training device inputs the sample real image B and the emulation image B1 into the second discriminator 84, and the second discriminator 84 performs discrimination and calculates a discriminator loss of the second discriminator 84 and a generator loss of the first generator 81 according to an actual discrimination result and a target discrimination result.

Optionally, the model training device constructs a loss function of the Cycle-GAN model according to the generator loss, the discriminator loss, and the cycle loss. In the loss function, a multiplication factor (weight) of the cycle loss is greater than a multiplication factor of the discriminator loss.

S505. Reversely train the Cycle-GAN model according to the loss of the Cycle-GAN model.

Optionally, the model training device trains the Cycle-GAN model by using a back propagation algorithm according to the generator loss, the discriminator loss, and the cycle loss of the Cycle-GAN model, and implementation of the specific manner of training the Cycle-GAN model according to the loss is not provided in one embodiment of the present disclosure.

Optionally, the loss function of the Cycle-GAN model finally obtained through training is minimum.

In the Cycle-GAN model finally obtained through training, a Nash equilibrium is realized between the generators and the discriminator, that is, a style of an image outputted by the generator is consistent with a style of a target image (the output approximates a target distribution), and the discriminator is in a random discrimination state (discrimination probabilities of the original image and the image outputted by the generator are equal).

Through the foregoing steps S501 to S505, the model training device performs training according to the sample virtual image and the sample real image to obtain the Cycle-GAN model used for style conversion, and when training a hand key-point recognition model subsequently, the model training device uses the Cycle-GAN model to convert a style of a sample virtual image carrying label information.

S506. Convert the sample virtual image into an emulation image by using the first generator in the Cycle-GAN model.

To make a training sample more similar to a real image acquired in a real scenario, the model training device inputs a sample virtual image into the first generator in the Cycle-GAN model, and the first generator converts the sample virtual image into an emulation image.

Because the hand in the emulation image may only take up a relatively small space, if training or testing is performed directly after the emulation image is scaled up/down, an area of the hand image is further compressed. In addition, hand key-points are densely distributed, and have self-occlusion and other problems. The recognition effect significantly declines in a case of low resolution and blurred images. To alleviate these problems, in one embodiment of the present disclosure, the model training device first locates a hand confidence region, and then cuts out the hand and a small surrounding region according to the hand confidence region.

The cut region is scaled up/down to be used as an input of the next level. As shown in FIG. 5, the model training device further extracts a hand image from the emulation image through the following steps S507 to S508.

S507. Input the emulation image into a gesture segmentation neural network, to output a hand confidence region, the gesture segmentation neural network being obtained by training according to images labeled with hand regions.

Figure 9:
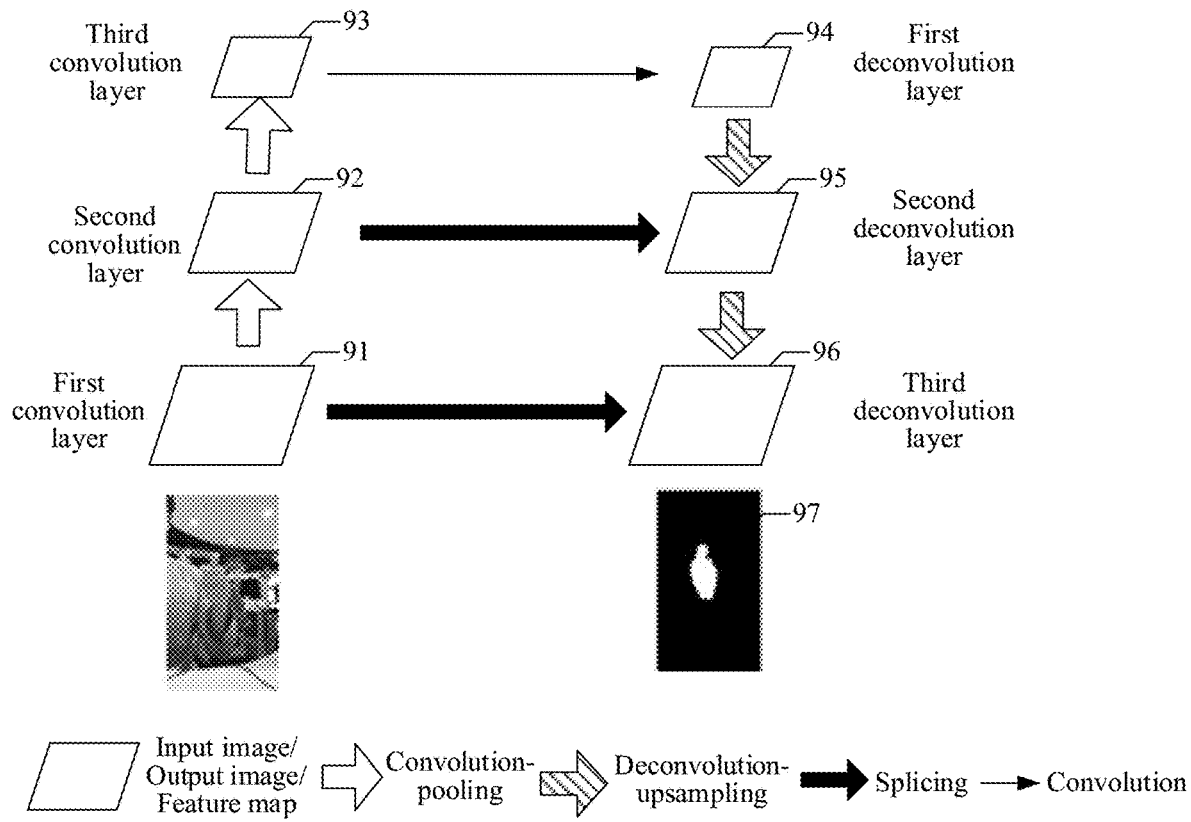
FIG. 9 is a schematic diagram of a principle of determining a hand confidence region by using a gesture segmentation neural network according to an embodiment of the present disclosure.

In a possible implementation, the gesture segmentation neural network is a convolutional neural network (CNN) with a U-NET structure, and includes n convolution layers and n deconvolution layers. The n convolution layers are used for performing feature extraction at different levels on an image, and the n deconvolution layers are used for decoding and outputting extracted features. For example, as shown in FIG. 9, the gesture segmentation neural network includes three convolution layers and three deconvolution layers.

Figure 10:
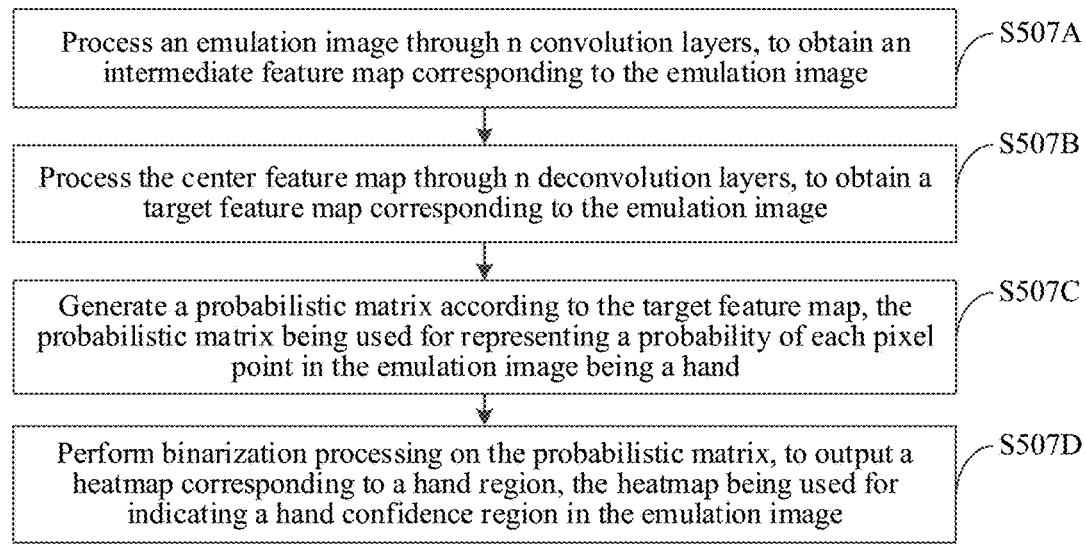
FIG. 10 is a method flowchart of a process of determining a hand confidence region by using a gesture segmentation neural network according to an embodiment of the present disclosure.

Optionally, as shown in FIG. 10, determining the hand confidence region through the gesture segmentation neural network includes the following steps.

S507A. Process the emulation image through n convolution layers, to obtain an intermediate feature map corresponding to the emulation image.

The model training device inputs the emulation image into the gesture segmentation neural network, and the n convolution layers perform convolution processing on the emulation image successively, to extract features in the emulation image and obtain the intermediate feature map corresponding to the emulation image. An input of the first convolution layer is an emulation image, and an output of an $i^{th}$ convolution layer is a feature map outputted by an $(i-1)^t$ convolution layer.

Optionally, in addition to performing the convolution processing on the input image or the feature map (the output of the previous convolution layer) by using the convolution kernel, each convolution layer further performs activation processing and pooling processing on a convolution result.

Activation processing may be performed on the convolution result by using the ReLU function. An activation function specifically used is not limited in one embodiment of the present disclosure.

After the activation processing, the convolution layer performs pooling processing on an activation result (feature map), and inputs the feature map after the pooling processing into a next convolution layer. The pooling processing is used for scaling down the size of the feature map, and retains important information in the feature map. Optionally, each pooling layer performs max-pooling processing on the inputted feature map. For example, when pooling processing is performed on the feature map by using 2×2 blocks and a step of 2, a maximum value in the 2×2 blocks in the feature map is extracted, and the size of the feature map are scaled down to a quarter of the original size.

Optionally, the pooling processing may be mean-pooling or stochastic-pooling, and this is not limited.

For example, as shown in FIG. 9, after an emulation image 91 is inputted into the first convolution layer, convolution-pooling processing is performed on the emulation image 91 at the first convolution layer, to obtain a feature map 92. The feature map 92 is inputted into the second convolution layer. After convolution-pooling processing is performed on the feature map 92 at the second convolution layer, a feature map 93 is obtained and inputted into the third convolution layer. After convolution-pooling processing is performed on the feature map 93 at the third convolution layer, a convolution operation is further performed on the feature map 93, to obtain a generated feature map 94. The feature map 94 is inputted into the n deconvolution layers.

S507B. Process the intermediate feature map through n deconvolution layers, to obtain a target feature map corresponding to the emulation image.

The gesture segmentation neural network further performs deconvolution processing on the intermediate feature map by using the n deconvolution layers, and finally obtains the target feature map corresponding to the emulation image. A size of the target feature map is equal to a size of the emulation image.

Because a low-level feature map has better spatial information, while a high-level feature map has better semantic information, to make the feature map better reflect the features, in a possible implementation, the high-level feature map is spliced and fused with the previously generated low-level feature map during the deconvolution operation on the intermediate feature map. Correspondingly, this step may include the following steps.

1. Splice a feature map outputted by an $m^{th}$ deconvolution layer and a feature map outputted by an $(n-m)^{th}$ convolution layer, $1 \leq m \leq n-1$.

For the feature map outputted by the $m^{th}$ deconvolution layer, the model training device performs channel splicing on the feature map and the feature map outputted by the $(n-m)^{th}$ convolution layer, so as to obtain a spliced feature map, and a number of channels of the spliced feature map is equal to a total number of channels of the two feature map before splicing. Because a size of the feature map outputted by the $(n-m)^{th}$ convolution layer are greater than a size of the feature map outputted by the $m^{th}$ deconvolution layer, up-sampling processing further needs to be performed on the feature map outputted by the $m^{th}$ deconvolution layer, so as to increase the size of the feature map.

Optionally, before splicing, convolution processing is further performed on the feature map by using a 1×1 convolution kernel, so as to reduce dimensions of the feature map, reduce the number of channels of the spliced feature map, and reduce the calculation amount. In addition to the 1×1 convolution kernel, a 3×3 convolution kernel may also be used for performing the convolution processing on the feature map, so as to expand a receptive field of the feature map and eliminate impact of edge inaccuracy in an up-sampling process.

2. Process the spliced feature map through an $(m+11)^{th}$ deconvolution layer.

Further, the spliced feature map is inputted into the $(m+1)^{th}$ deconvolution layer, and the $(m+1)^{th}$ deconvolution layer performs deconvolution and activation processing on the spliced feature map.

For example, as shown in FIG. 9, after deconvolution-up-sampling processing is performed on the feature map 94 at the first deconvolution layer, the feature map 94 is spliced with the feature map 92 generated at the second convolution layer, to generate a feature map 95. The feature map 95 is inputted into the second deconvolution layer. After deconvolution-up-sampling processing is performed on the feature map 95 at the second deconvolution layer, the feature map 95 is spliced with the feature map 91 generated at the first convolution layer to generate a feature map 96.

The foregoing embodiment is described by using an example in which three convolution layers and three deconvolution layers are included, and this does not constitute a limitation on the structure of the gesture segmentation neural network.

S507C. Generate a probabilistic matrix according to the target feature map, the probabilistic matrix being used for representing a probability of each pixel point in the emulation image being the hand.

Further, the model training device determines a hand confidence region in the emulation image according to the outputted target feature map. In a possible implementation, the model training device performs pixel-level recognition and classification according to the target feature map, and determines a probability of each pixel point corresponding to a hand region, where a higher probability corresponding to the pixel point indicates a higher probability of the pixel point being the hand region.

S507D. Perform binarization processing on the probabilistic matrix, to output a heatmap corresponding to a hand region, the heatmap being used for indicating a hand confidence region in the emulation image.

For a manner of binarization processing, in a possible implementation, the model training device compares a value of each probability in the probabilistic matrix with a value of a probability threshold. If the probability is greater than the probability threshold, the probability is set to 1; and if the probability is less than the probability threshold, the probability is set to 0.

Figures 11, 12:
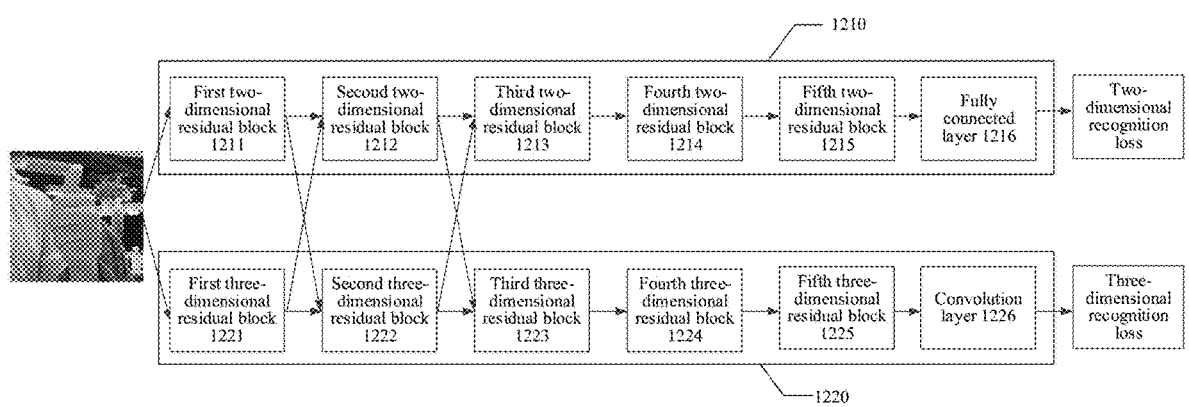
FIG. 11 is a schematic implementation diagram of binarization processing according to an embodiment of the present disclosure.
FIG. 12 is a schematic structural diagram of a hand key-point recognition model according to an embodiment of the present disclosure.

For example, as shown in FIG. 11, the model training device performs binarization processing on a probabilistic matrix 1101 according to a probability threshold 0.6, sets a value of a region with a probability greater than 0.6 to 1, and sets a value of a region with a probability less than 0.6 to 0, to obtain a heatmap 1102. In the heatmap 1102, the region with a value being 1 is the hand confidence region.

For example, as shown in FIG. 9, in a heatmap 97 obtained after the binarization processing, a white region is the hand confidence region, and a black region is a non-hand confidence region.

S508. Extract a hand image from the emulation image according to the hand confidence region.

The model training device extracts the hand image from the emulation image according to coordinates of the hand confidence region outputted by the gesture segmentation neural network.

In the foregoing S507D, when the hand confidence region is obtained through binarization processing, some pixel points in the hand region may be incorrectly divided into a non-hand region, and some pixel points in the non-hand region are incorrectly divided into the hand region. Such incorrect divisions are usually located at an edge of an actual hand region. Therefore, in a possible implementation, the model training device extracts a hand image with a size slightly larger than the hand confidence region from an XY plane of the emulation image according to the coordinates of the hand confidence region.

Optionally, the model training device performs scaling processing on the extracted hand image, to ensure that a size of the hand image is consistent with an input size of the hand key-point recognition model.

S509. Construct a hand key-point recognition model, the hand key-point recognition model including a two-dimensional recognition branch and a three-dimensional recognition branch.

During hand key-point recognition by using the model obtained through training in FIG. 2, a heatmap of two-dimensional key-points is first obtained by using a 2D key-point recognition model 23, and then the two-dimensional key-points are inputted into a 3D key-point recognition model 24, to finally obtain three-dimensional coordinates of the hand key-points. However, in such a manner, the two-dimensional and three-dimensional hand key-points are recognized by using independent models, while intrinsic correlation between two-dimensional and three-dimensional perception are ignored, resulting in relatively low accuracy of key-point recognition.

In one embodiment of the present disclosure, the model training device trains the hand key-point recognition model by using a deep learning method of coupling the two-dimensional heatmap to the three-dimensional key-point coordinates. This coupling manner is closer to a visual image processing mechanism of human eyes (depth stereo information is predicted in a three-dimensional way, and appearance information is observed in a two-dimensional way). Therefore, key-point recognition using the model obtained through training has higher accuracy.

Optionally, the hand key-point recognition model constructed by the model training device includes the two-dimensional recognition branch and the three-dimensional recognition branch, the two-dimensional recognition branch including i two-dimensional residual layers and a convolution layer, the three-dimensional recognition branch including i three-dimensional residual layers and a fully connected layer, and first j two-dimensional residual layers being coupled to first j three-dimensional residual layers, $2 \leq j \leq i-1$, i and j being integers.

Optionally, for example, as shown in FIG. 12, the hand key-point recognition model constructed by the model training device includes a two-dimensional recognition branch 1210 and a three-dimensional recognition branch 1220. The two-dimensional recognition branch 1210 includes five two-dimensional residual blocks (each two-dimensional residual block corresponds to a two-dimensional residual layer) and a fully connected layer 1216; the three-dimensional recognition branch 1220 includes five three-dimensional residual blocks (each three-dimensional residual block corresponds to a three-dimensional residual layer) and a convolution layer 1226; and first three layers of the two-dimensional recognition branch 1210 are coupled to first three layers of the three-dimensional recognition branch 1220. Optionally, the residual blocks in the two-dimensional recognition branch and the three-dimensional recognition branch may be common residual blocks, and dimensions of the feature map may be reduced by using a convolution kernel with a step of 2 in some of the residual blocks, to reduce the calculation amount and expand the receptive field of the feature map. This is not limited.

In FIG. 12, inputs of a first two-dimensional residual block 1211 and a first three-dimensional residual block 1221 are both extracted hand images; an input of a second two-dimensional residual block 1212 is the outputs of the first two-dimensional residual block 1211 and the first three-dimensional residual block 1221; an input of a second three-dimensional residual block 1222 is the outputs of the first two-dimensional residual block 1211 and the first three-dimensional residual block 1221; an input of a third two-dimensional residual block 1213 is outputs of the second two-dimensional residual block 1212 and the second three-dimensional residual block 1222; and an input of a third three-dimensional residual block 1223 is the outputs of the second two-dimensional residual block 1212 and the second three-dimensional residual block 1222.

S510. Calculate a two-dimensional recognition loss and a three-dimensional recognition loss of the hand key-point recognition model according to the hand image and the key-point coordinates, the two-dimensional recognition loss being a recognition loss of the two-dimensional recognition branch, and the three-dimensional recognition loss being a recognition loss of the three-dimensional recognition branch.

Figure 13:
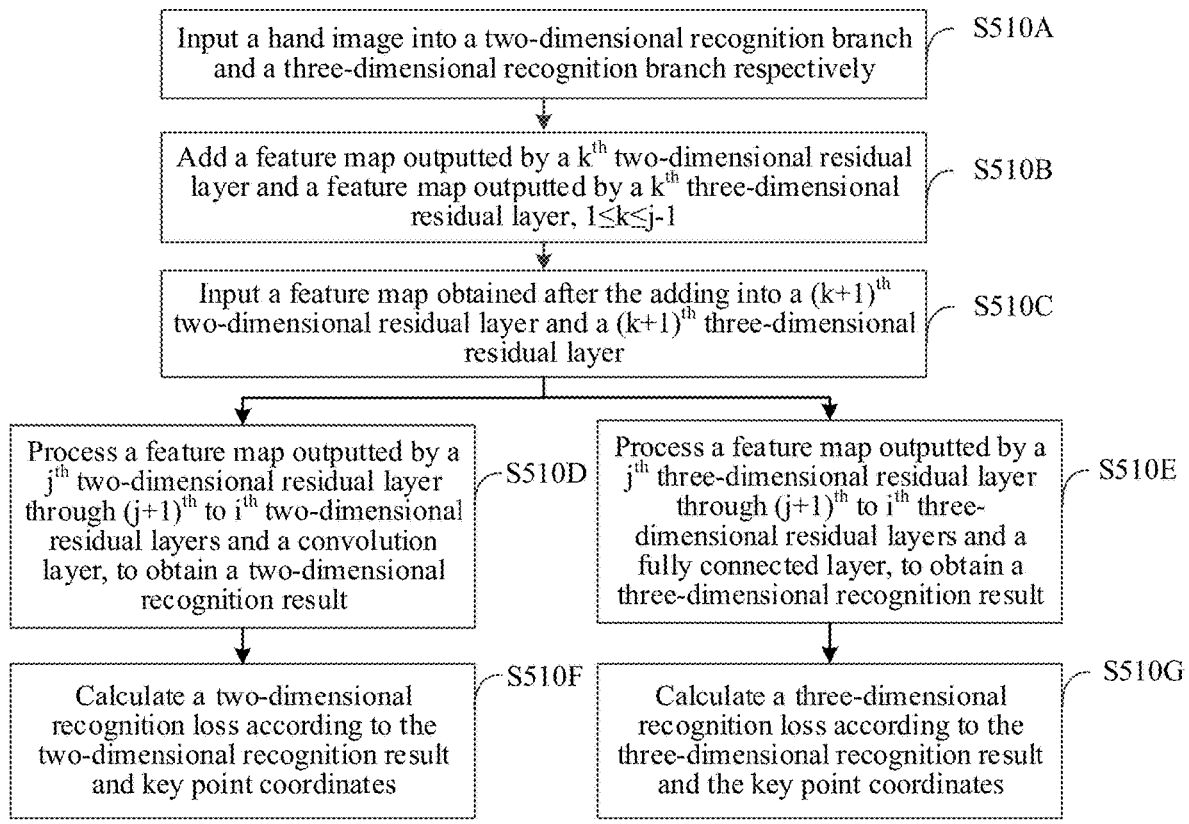
FIG. 13 is a flowchart of a hand key-point recognition model training method according to an embodiment of the present disclosure.

Further, the model training device inputs the hand image into the two-dimensional recognition branch and the three-dimensional recognition branch respectively, and calculates the two-dimensional recognition loss according to the key-point coordinates and a recognition result outputted by the two-dimensional recognition branch, and calculates the three-dimensional recognition loss according to the key-point coordinates and a recognition result outputted by the three-dimensional recognition branch. In a possible implementation, as shown in FIG. 13, this step includes the following steps.

S510A. Input the hand image into the two-dimensional recognition branch and the three-dimensional recognition branch respectively.

As shown in FIG. 12, the model training device inputs the hand image into the first two-dimensional residual block 1211 and the first three-dimensional residual block 1221 respectively.

S510B. Perform adding a feature map outputted by a $k^{th}$ two-dimensional residual layer and a feature map outputted by a $k^{th}$ three-dimensional residual layer, $1 \leq k \leq j-1$.

For the first j two-dimensional residual layers and first j three-dimensional residual layers coupled to each other, the model training device perform adds the feature map outputted by the $k^{th}$ two-dimensional residual layer and the feature map outputted by the $k^{th}$ three-dimensional residual layer, and uses a feature map obtained after the adding as an input of a $(k+1)^{th}$ two-dimensional residual layer and a $(k+1)^{th}$ three-dimensional residual layer.

Dimensions of the feature maps that are added together are the same, and dimensions of the feature maps before and after the adding are kept the same.

For example, as shown in FIG. 12, the model training device performs an element-level adding operation on feature maps outputted by the first two-dimensional residual block 1211 and the first three-dimensional residual block 1221, and performs an element-level adding operation on feature maps outputted by the second two-dimensional residual block 1212 and the second three-dimensional residual block 1222.

S510C. Input a feature map obtained after the adding into the $(k+1)^{th}$ two-dimensional residual layer and the $(k+1)^{th}$ three-dimensional residual layer.

Further, the model training device inputs the feature map obtained after the adding into the $(k+1)^{th}$ two-dimensional residual layer and the $(k+1)^{th}$ three-dimensional residual layer respectively. The $(k+1)^{th}$ two-dimensional residual layer and the $(k+1)^{th}$ three-dimensional residual layer perform residual processing on the feature map obtained after the adding.

For first (j−1) two-dimensional residual layers and first (j−1) three-dimensional residual layers, the model training device repeats S510B and S510C, until a feature map obtained after adding is inputted into a $j^{th}$ two-dimensional residual layer and a $j^{th}$ three-dimensional residual layer.

S510D. Process a feature map outputted by the $j^{th}$ two-dimensional residual layer through $(j+1)^{th}$ to $i^{th}$ two-dimensional residual layers and the convolution layer, to obtain a two-dimensional recognition result.

For the feature map outputted by the $j^{th}$ two-dimensional residual layer, the model training device performs residual processing on the feature map through the $(j+1)^{th}$ to the $i^{th}$ two-dimensional residual layers successively, further processes the feature map outputted by the $i^{th}$ two-dimensional residual layer through the convolution layer, to obtain the two-dimensional recognition result, and performs the following S510F.

Optionally, the two-dimensional recognition result is a heatmap of the two-dimensional key-points in the hand image. A size of the heatmap is consistent with that of the hand image, and a point with a high response in the heatmap is a hand key-point.

Optionally, the two-dimensional recognition branch superimposes and displays the hand key-points indicated by the two-dimensional recognition result on the original emulation image, and uses different colors to identify hand key-points corresponding to different fingers.

S510E. Process a feature map outputted by the $j^{th}$ three-dimensional residual layer through $(j+1)^{th}$ to $i^{th}$ three-dimensional residual layers and the fully connected layer, to obtain a three-dimensional recognition result.

Similar to the two-dimensional recognition, for the feature map outputted by the $j^{th}$ three-dimensional residual layer, the model training device performs residual processing on the feature map through the $(j+1)^{th}$ to the $i^{th}$ three-dimensional residual layers successively, further processes the feature map outputted by the $i^{th}$ three-dimensional residual layer through the fully connected layer, to obtain the three-dimensional recognition result, and performs the following S510G.

Optionally, the three-dimensional recognition result is three-dimensional coordinates of each hand key-point in the hand image, and the three-dimensional coordinates are relative coordinates. That is, by using a preset key-point in the hand as an origin of coordinates, normalized distances between other key-points and the preset key-point are calculated to determine three-dimensional coordinates of the other key-points. For example, when 21 hand key-points are included, a number of nerve cells of the fully connected layer in the three-dimensional recognition branch is 21×3=63.

S510F. Calculate the two-dimensional recognition loss according to the two-dimensional recognition result and the key-point coordinates.

The model training device calculates, according to two-dimensional coordinates of the hand key-points indicated by the two-dimensional recognition result, the two-dimensional recognition loss between the two-dimensional coordinates and the key-point coordinates (that is, a ground truth). Optionally, the key-point coordinates are two-dimensional coordinates of the hand key-points in the sample virtual image, and the two-dimensional recognition loss may be identified by using a Euclidean distance. For example, when two-dimensional coordinates of a key-point A in the two-dimensional recognition result are (100 px, 150 px), and actual two-dimensional coordinates of the key-point A are (90 px, 140 px), a two-dimensional recognition loss of the key-point A is $\sqrt{(100-90)^2+(150-140)^2}=10\sqrt{2}$.

S510G. Calculate the three-dimensional recognition loss according to the three-dimensional recognition result and the key-point coordinates.

Similar to the calculating of the two-dimensional recognition loss, the model training device calculates, according to three-dimensional coordinates of the hand key-point indicated by the three-dimensional recognition result, the three-dimensional recognition loss between the three-dimensional coordinates and the key point coordinates (that is, the ground truth). Optionally, the key point coordinates are three-dimensional coordinates of the hand key-points in the sample virtual image, and the three-dimensional recognition loss may be identified by using a Euclidean distance. For example, when two-dimensional coordinates of the key-point A in the three-dimensional recognition result are (100 px, 150 px, 100 px), and actual three-dimensional coordinates of the key-point A are (90 px, 140 px, 100 px), a three-dimensional recognition loss of the key-point A is $\sqrt{(100-90)^2+(150-140)^2}=10\sqrt{2}$.

S511. Reversely train the hand key-point recognition model according to the two-dimensional recognition loss and the three-dimensional recognition loss.

Optionally, the model training device trains the two-dimensional recognition branch of the hand key-point recognition model by using the back propagation algorithm according to the calculated two-dimensional recognition loss; and the model training device trains the three-dimensional recognition branch of the hand key-point recognition model by using the back propagation algorithm according to the calculated three-dimensional recognition loss. A specific manner of training the hand key-point recognition model according to the recognition loss is not limited.

In one embodiment, a Cycle-GAN model including two generators and two discriminators are constructed, and the Cycle-GAN model is reversely trained according to a generator loss, a discriminator loss, and a cycle loss, thereby improving the quality of the obtained Cycle-GAN model.

In one embodiment, during training of a hand key-point recognition model, a two-dimensional recognition branch is coupled to a three-dimensional recognition branch, so that the trained hand key-point recognition model is closer to a visual image processing mechanism of human eyes, thereby improving the accuracy of hand key-point recognition.

Figure 14:
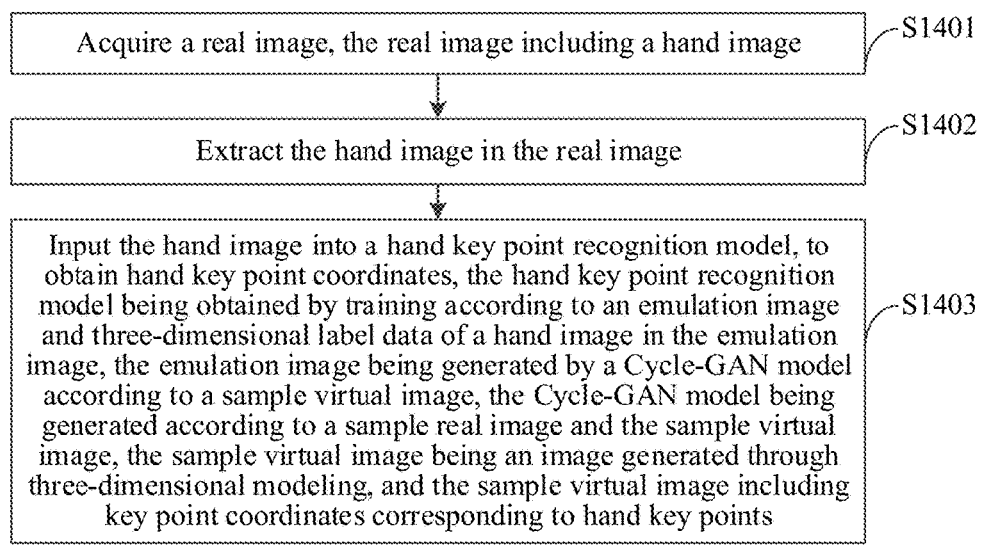
FIG. 14 is a flowchart of a hand key-point recognition method according to an embodiment of the present disclosure.

FIG. 14 is a flowchart of a recognition method according to an embodiment of the present disclosure. Using an example in which the hand key-point recognition method is applied to a hand key-point recognition device, the method may include the followings.

S1401. Acquire a real image, the real image including a hand image.

In a possible implementation, the hand key-point recognition device is a terminal provided with a camera, and the terminal acquires a real image including a hand image by using the camera or other image acquisition device.

S1402. Extract a hand image in the real image.

In a possible implementation, the hand key-point recognition device extracts the hand image in the real image by using a gesture segmentation neural network in the embodiment shown in FIG. 5. A process of extracting the hand image is not described again here.

S1403. Input the hand image into a hand key-point recognition model, to obtain hand key-point coordinates, the hand key-point recognition model being obtained by training according to an emulation image and three-dimensional label data of a hand image in the emulation image, the emulation image being generated by a Cycle-GAN model according to a sample virtual image, the Cycle-GAN model being generated according to a sample real image and the sample virtual image, the sample virtual image being an image generated through three-dimensional modeling, and the sample virtual image including key-point coordinates corresponding to hand key-points.

The hand key-point recognition device inputs the extracted hand image into the hand key-point recognition model obtained through training in the foregoing embodiment, to obtain the hand key-point coordinates outputted by the model. The hand key-point coordinates are two-dimensional coordinates and/or three-dimensional coordinates.

Figure 15:
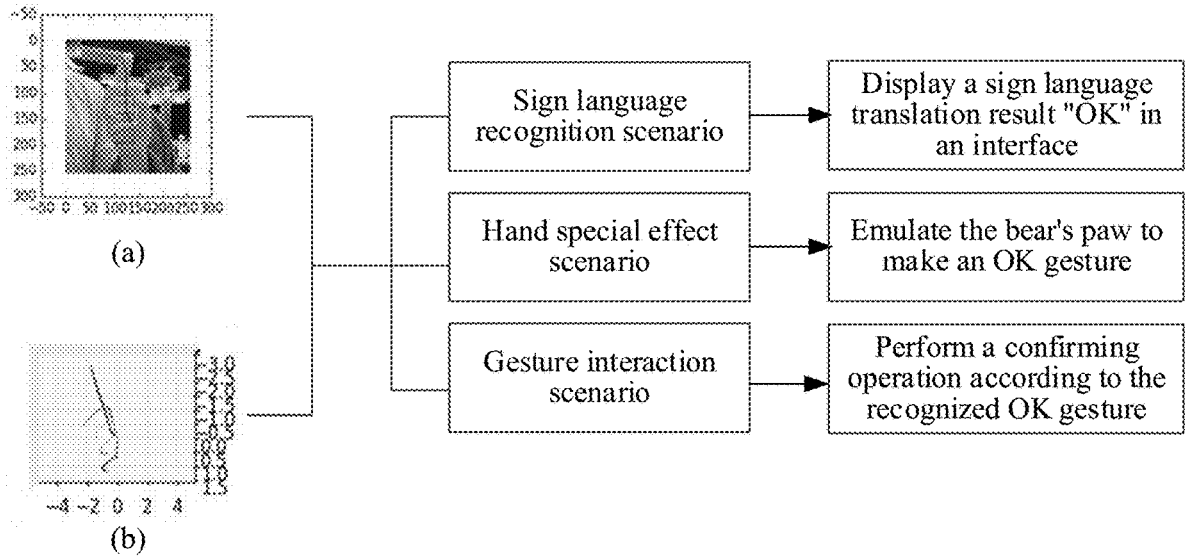
FIG. 15 is a schematic diagram of a use of a hand key-point recognition result in different application scenarios.

In a possible implementation, as shown in (a) in FIG. 15, when the hand key-point coordinates are two-dimensional coordinates, the hand key-point recognition device superimposes and displays the hand key-points on a real image according to the two-dimensional coordinates, and uses different colors to identify key-points on the same finger; as shown in (b) in FIG. 15, when the hand key-point coordinates are three-dimensional coordinates, the hand key-point recognition device constructs a three-dimensional hand model in a three-dimensional coordinate system according to the three-dimensional coordinates, and uses different colors to identify key-points on the same finger.

As shown in FIG. 15, when the foregoing method is applied to a sign language recognition scenario, the terminal displays a sign language translation result "OK" in an interface according to an OK gesture recognized based on the hand key-points; when the method is applied to a hand special effect scenario, the terminal emulates a bear's paw to make a gesture "OK" in a hand region in the interface according to the recognized OK gesture; and when the method is applied to a gesture interaction scenario, a smart home device performs a confirming operation according to the recognized OK gesture.

Accordingly, a Cycle-GAN model is trained according to a sample real image and a sample virtual image in advance, and the sample virtual image is converted into an emulation image by using the Cycle-GAN model, so as to train a hand key-point recognition model according to a hand image in the emulation image and key point coordinates. The emulation image obtained through conversion by the Cycle-GAN model can emulate a style of the sample real image, that is, a training sample is more similar to the acquired real image. Therefore, subsequent gesture recognition for a real image by using the hand key-point recognition model has higher accuracy. Moreover, the hand key-point recognition model is trained based on the sample virtual image carrying the key point coordinates, thereby avoiding manual labeling of the key point coordinates, and further improving the efficiency and accuracy of the model training.

Figure 16:
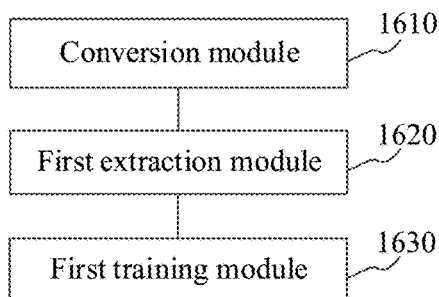
FIG. 16 is a block diagram of a hand key-point recognition model training apparatus according to an embodiment of the present disclosure.

FIG. 16 is a block diagram of a recognition model training apparatus according to an embodiment of the present disclosure. The apparatus has functions of performing the foregoing disclosed methods. The functions may be implemented by hardware, or may be implemented by hardware executing corresponding software programs. The apparatus may include: a conversion module 1610, a first extraction module 1620, and a first training module 1630.

The conversion module 1610 is configured to convert a sample virtual image into an emulation image by using a Cycle-GAN model, the sample virtual image being an image generated through three-dimensional modeling, the sample virtual image including key-point coordinates corresponding to hand key-points, and the emulation image being used for emulating an image acquired in a real scenario.

The first extraction module 1620 is configured to extract a hand image in the emulation image.

The first training module 1630 is configured to train a hand key-point recognition model according to the hand image in the emulation image and the key-point coordinates, the hand key-point recognition model being used for outputting hand key-point coordinates of a hand in a real image according to the inputted real image.

Optionally, the apparatus further includes: a second training module, configured to train the Cycle-GAN model according to a sample real image and the sample virtual image, the sample real image being an image acquired in the real scenario.

Optionally, the second training module is further configured to construct a first generator and a second generator, the first generator being configured to generate the emulation image, and the second generator being configured to generate a pseudo-virtual image, the pseudo-virtual image being used for emulating a style of the sample virtual image; construct a first discriminator and a second discriminator, the first discriminator being configured to discriminate the sample virtual image from the pseudo-virtual image, and the second discriminator being configured to discriminate the sample real image from the emulation image; construct the Cycle-GAN model according to the first generator, the second generator, the first discriminator, and the second discriminator; calculate a loss of the Cycle-GAN model according to the sample real image and the sample virtual image, the loss of the Cycle-GAN model including a generator loss, a discriminator loss, and a cycle loss; and reversely train the Cycle-GAN model according to the loss of the Cycle-GAN model.

Optionally, the conversion module 1610 is further configured to convert the sample virtual image into the emulation image by using the first generator in the Cycle-GAN model.

Optionally, the first extraction module 1620 is further configured to input the emulation image into a gesture segmentation neural network, to output a hand confidence region, the gesture segmentation neural network being obtained by training according to images labeled with hand regions; and extract a hand image from the emulation image according to the hand confidence region.

Optionally, the gesture segmentation neural network includes n convolution layers and n deconvolution layers, n being an integer greater than or equal to 2; and the first extraction module 1620 is further configured to process the emulation image through the n convolution layers, to obtain an intermediate feature map corresponding to the emulation image; process the intermediate feature map through the n deconvolution layers, to obtain a target feature map corresponding to the emulation image; generate a probabilistic matrix according to the target feature map, the probabilistic matrix being used for representing a probability of each pixel point in the emulation image being the hand; and perform binarization processing on the probabilistic matrix, to output a heatmap corresponding to the hand region, the heatmap being used for indicating the hand confidence region in the emulation image.

Optionally, when processing the intermediate feature map through the n deconvolution layers, to obtain the target feature map corresponding to the emulation image, the first extraction module 1620 is further configured to splice a feature map outputted by an $m^{th}$ deconvolution layer and a feature map outputted by an $n-m^{th}$ convolution layer, $1 \le m \le n-1$; and process a spliced feature map through an $(m+1)^{th}$ deconvolution layer.

Optionally, the first training module 1630 is further configured to construct the hand key-point recognition model, the hand key-point recognition model including a two-dimensional recognition branch and a three-dimensional recognition branch, the two-dimensional recognition branch including i two-dimensional residual layers and a convolution layer, the three-dimensional recognition branch including i three-dimensional residual layers and a fully connected layer, and first j two-dimensional residual layers being coupled to first j three-dimensional residual layers, $2 \le j \le i-1$, i and j being integers; calculate a two-dimensional recognition loss and a three-dimensional recognition loss of the hand key-point recognition model according to the hand image and the key-point coordinates, the two-dimensional recognition loss being a recognition loss of the two-dimensional recognition branch, and the three-dimensional recognition loss being a recognition loss of the three-dimensional recognition branch; and reversely train the hand key-point recognition model according to the two-dimensional recognition loss and the three-dimensional recognition loss.

Optionally, when calculating the two-dimensional recognition loss and the three-dimensional recognition loss of the hand key-point recognition model according to the hand image and the key-point coordinates, the first training module 1630 is further configured to input the hand image into the two-dimensional recognition branch and the three-dimensional recognition branch respectively; add a feature map outputted by a $k^{th}$ two-dimensional residual layer and a feature map outputted by a $k^{th}$ three-dimensional residual layer, $1 \le k \le j-1$; input a feature map obtained after the adding into a $(k+1)^{th}$ two-dimensional residual layer and a $(k+1)^{th}$ three-dimensional residual layer; process a feature map outputted by the $j^{th}$ two-dimensional residual layer through $(j+1)^{th}$ to $i^{th}$ two-dimensional residual layers and the convolution layer, to obtain a two-dimensional recognition result; process a feature map outputted by the $j^{th}$ three-dimensional residual layer through $(j+1)^{th}$ to $i^{th}$ three-dimensional residual layers and the fully connected layer, to obtain a three-dimensional recognition result; calculate the two-dimensional recognition loss according to the two-dimensional recognition result and the key-point coordinates; and calculate the three-dimensional recognition loss according to the three-dimensional recognition result and the key-point coordinates.

Figure 17:
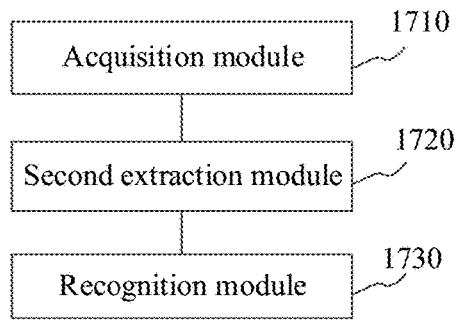
FIG. 17 is a block diagram of a hand key-point recognition apparatus according to an embodiment of the present disclosure.

FIG. 17 is a block diagram of a recognition apparatus according to an embodiment of the present disclosure. The apparatus has functions of performing the foregoing disclosed methods. The functions may be implemented by hardware, or may be implemented by hardware executing corresponding software programs. The apparatus may include: an acquisition module 1710, a second extraction module 1720, and a recognition module 1730.

The acquisition module 1710 is configured to acquire a real image, the real image including a hand image.

The second extraction module 1720 is configured to extract the hand image in the real image.

The recognition module 1730 is configured to input the hand image into a hand key-point recognition model, to obtain hand key-point coordinates, the hand key-point recognition model being obtained by training according to an emulation image and three-dimensional label data of a hand image in the emulation image, the emulation image being generated by a Cycle-GAN model according to a sample virtual image, the Cycle-GAN model being generated according to a sample real image and the sample virtual image, the sample virtual image being an image generated through three-dimensional modeling, and the sample virtual image including key-point coordinates corresponding to hand key-points.

Figure 18:
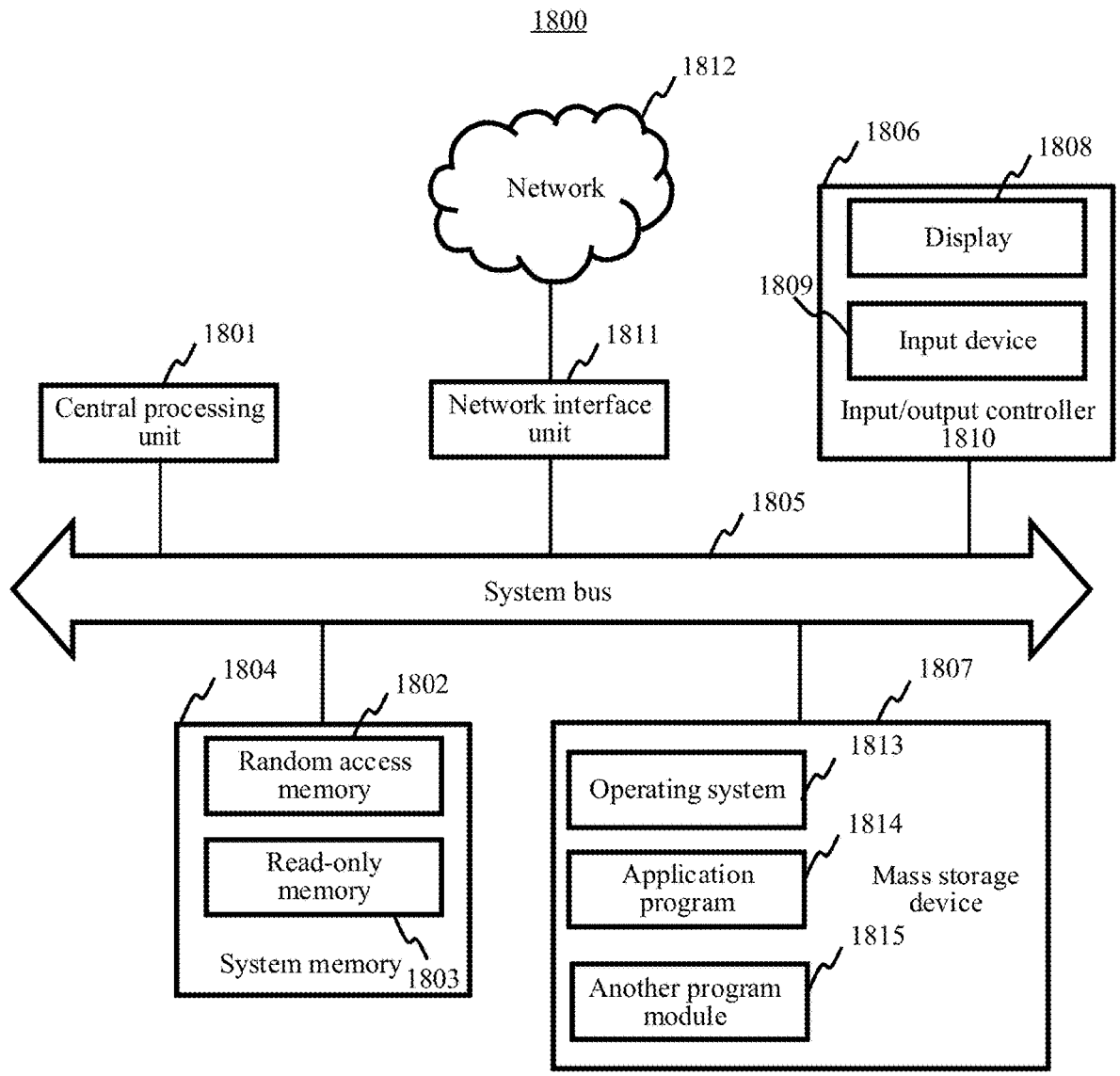
FIG. 18 is a schematic structural diagram of a model training device according to an embodiment of the present disclosure.

FIG. 18 is a schematic structural diagram of a model training device according to an embodiment of the present disclosure. The model training device is configured to implement the hand key-point recognition model training method provided in the foregoing embodiments.

Specifically, the model training device 1800 may be a computer system that includes a central processing unit (CPU) 1801, a system memory 1804 including a random access memory (RAM) 1802 and a read-only memory (ROM) 1803, and a system bus 1805 connecting the system memory 1804 and the CPU 1801. The model training device 1800 further includes a basic input/output system (I/O system) 1806 configured to transmit information between components in a computer, and a mass storage device 1807 configured to store an operating system 1813, an application program 1814, and another program module 1815.

The basic I/O system 1806 includes a display 1808 configured to display information and an input device 1809 such as a mouse or a keyboard that is configured to allow a user to input information. The display 1808 and the input device 1809 are both connected to the CPU 1801 by an input/output controller 1810 connected to the system bus 1805. The basic I/O system 1806 may further include the input/output controller 1810 for receiving and processing an input from a plurality of other devices such as a keyboard, a mouse, or an electronic stylus. Similarly, the input/output controller 1810 further provides an output to a display screen, a printer, or another type of output device.

The mass storage device 1807 is connected to the CPU 1801 by using a mass storage controller (not shown) connected to the system bus 1805. The mass storage device 1807 and an associated computer-readable medium provide non-volatile storage for the model training device 1800. That is, the mass storage device 1807 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1804 and the mass storage device 1807 may be generally referred to as a memory.

According to the embodiments of the present disclosure, the model training device 1800 may be further connected, through a network such as the Internet, to a remote computer on the network and run. That is, the model training device 1800 may be connected to a network 1812 by using a network interface unit 1811 connected to the system bus 1805, or may be connected to another type of network or a remote computer system by using the network interface unit 1811.

The memory stores at least one instruction, at least one program, a code set, or an instruction set, and the at least one instruction, the at least one program, the code set, or the instruction set is configured to be executed by one or more processors to implement functions of the steps of the foregoing hand key-point recognition model training method.

Figure 19:
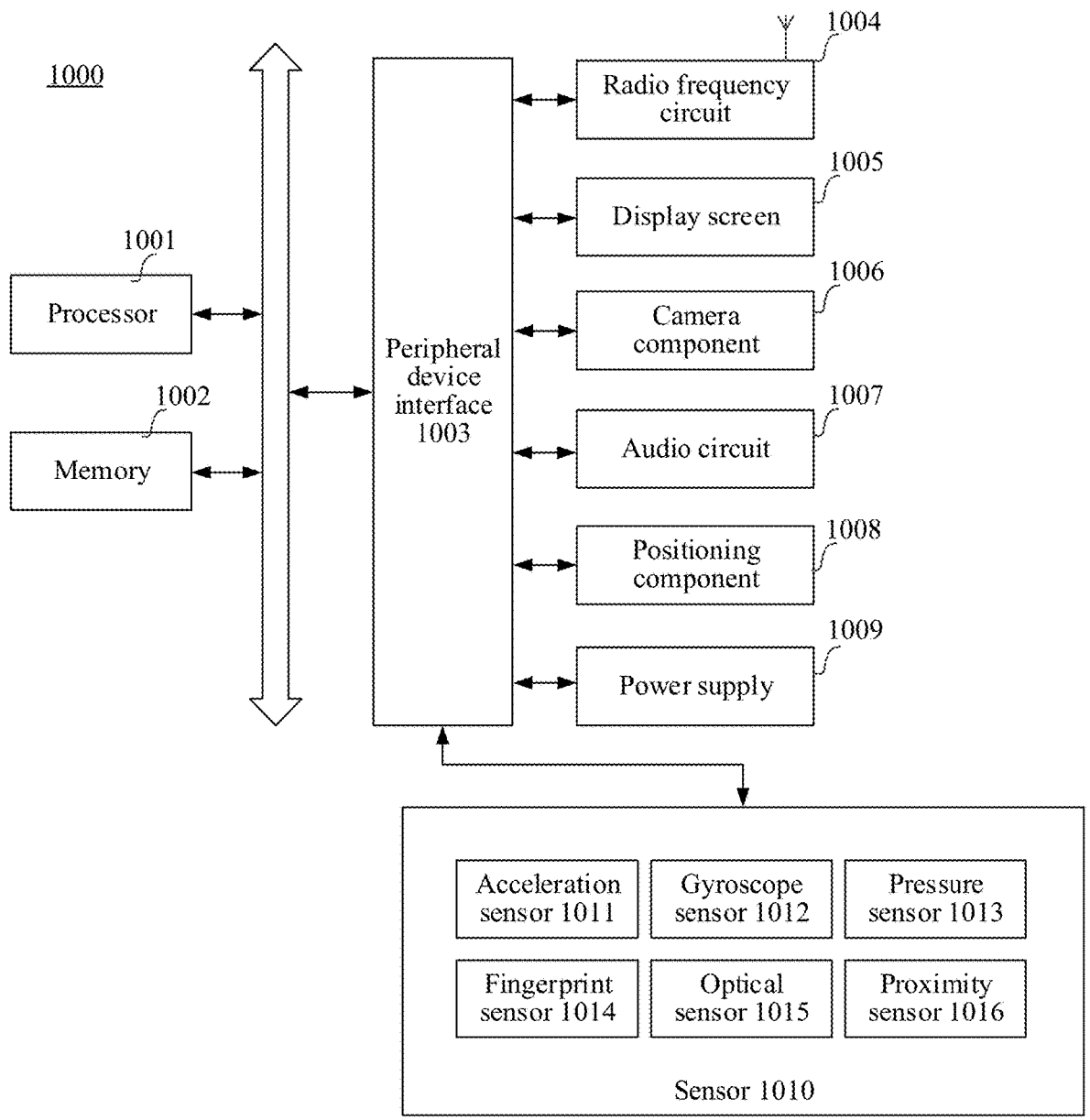
FIG. 19 is a structural block diagram of a hand key-point recognition device according to an exemplary embodiment of the present disclosure.

FIG. 19 is a structural block diagram of a hand key-point recognition device 1000 according to an exemplary embodiment of the present disclosure. The hand key-point recognition device 1000 may be a specialized computer system such as a portable mobile terminal, for example, a smartphone, a tablet computer, a moving picture experts group audio layer III (MP3) player, or a moving picture experts group audio layer IV (MP4) player.

Generally, the hand key-point recognition device 1000 includes: a processor 1001 and a memory 1002.

The processor 1001 may include one or more processing cores, for example, a 4-core processor or an 8-core processor. The processor 1001 may be implemented by using at least one hardware form of digital signal processing (DSP), a field-programmable gate array (FPGA), and a programmable logic array (PLA). The processor 1001 may alternatively include a main processor and a coprocessor. The main processor is a processor configured to process data in an awake state, and is also referred to as a central processing unit (CPU). The coprocessor is a low-power processor configured to process data in an idle state. In some embodiments, the processor 1001 may be integrated with a graphics processing unit (GPU). The GPU is responsible for rendering and drawing content to be displayed by a display screen. In some embodiments, the processor 1001 may further include an artificial intelligence (AI) processor. The AI processor is configured to process a computing operation related to machine learning. Optionally, in one embodiment of the present disclosure, the AI processor is a neural network processor (chip) having a gesture recognition function.

The memory 1002 may include one or more computer-readable storage media. The computer-readable storage medium may be tangible and non-transient. The memory 1002 may further include a high-speed random access memory and a non-volatile memory such as one or more magnetic disk storage devices and a flash storage device. In some embodiments, the non-transient computer-readable storage medium in the memory 1002 is configured to store at least one instruction, and the at least one instruction is configured to be executed by the processor 1001 to implement the hand key-point recognition method provided in the present disclosure.

In some embodiments, the hand key-point recognition device 1000 further optionally includes a peripheral device interface 1003 and at least one peripheral device. Specifically, the peripheral device includes: at least one of a radio frequency circuit 1004, a touch display screen 1005, a camera assembly 1006, an audio circuit 1007, a positioning component 1008, and a power supply 1009.

The peripheral device interface 1003 may be configured to connect at least one peripheral device related to input/output (I/O) to the processor 1001 and the memory 1002. In some embodiments, the processor 1001, the memory 1002, and the peripheral device interface 1003 are integrated into a same chip or circuit board; in some other embodiments, any one or two of the processor 1001, the memory 1002, and the peripheral device interface 1003 may be implemented on an independent chip or circuit board. This is not limited.

The radio frequency circuit 1004 is configured to receive and transmit a radio frequency (RF) signal, which is also referred to as an electromagnetic signal. The radio frequency circuit 1004 communicates with a communication network and another communication device by using the electromagnetic signal. The radio frequency circuit 1004 converts an electrical signal into an electromagnetic signal for transmission, or converts a received electromagnetic signal into an electrical signal. Optionally, the radio frequency circuit 1004 includes: an antenna system, an RF transceiver, one or more amplifiers, a tuner, an oscillator, a digital signal processor, a codec chip set, a subscriber identity module card, and the like. The radio frequency circuit 1004 may communicate with another terminal through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the radio frequency circuit 1004 may also include a circuit related to near field communication (NFC). This is not limited in the present disclosure.

The touch display screen 1005 is configured to display a user interface (UI). The UI may include a graph, a text, an icon, a video, and any combination thereof. The touch display screen 1005 also has a capability of collecting a touch signal on or above a surface of the touch display screen 1005. The touch signal may be used as a control signal to be inputted into the processor 1001 for processing. The touch display screen 1005 is configured to provide a virtual button and/or a virtual keyboard, which is also referred to as a soft button and/or a soft keyboard. In some embodiments, there may be one touch display screen 1005, disposed on a front panel of the hand key-point recognition device 1000. In some other embodiments, there may be at least two touch display screens 1005, disposed on different surfaces of the hand key-point recognition device 1000 respectively or adopting a folded design. In still other embodiments, the touch display screen 1005 may be a flexible display screen, disposed on a curved surface or a folded surface of the hand key-point recognition device 1000. Even, the touch display screen 1005 may be further set in a non-rectangular irregular pattern, namely, a special-shaped screen. The touch display screen 1005 may be made of a material such as a liquid crystal display (LCD) or an organic light-emitting diode (OLED).

The camera component 1006 is configured to collect an image or a video. Optionally, the camera component 1006 includes a front-facing camera and a rear-facing camera. Generally, the front-facing camera is configured to implement a video call or selfie. The rear-facing camera is configured to shoot a picture or a video. In some embodiments, there are at least two rear-facing cameras, each of which is any one of a main camera, a depth-of-field camera and a wide-angle camera, so as to implement a background blurring function by fusing the main camera and the depth-of-field camera, and panoramic shooting and virtual reality (VR) shooting functions by fusing the main camera and the wide-angle camera. In some embodiments, the camera component 1006 may further include a flash. The flash may be a single color temperature flash, or may be a double color temperature flash. The double color temperature flash refers to a combination of a warm flash and a cold flash, and may be configured to perform light ray compensation at different color temperatures.

The audio circuit 1007 is configured to provide an audio interface between a user and the hand key-point recognition device 1000. The audio circuit 1007 may include a microphone and a speaker. The microphone is configured to collect sound waves of a user and an environment, and convert the sound waves into electrical signals and input the electrical signals into the processor 1001 for processing, or input the electrical signals into the radio frequency circuit 1004 to implement voice communication. For stereo collection or noise reduction, there may be a plurality of microphones, disposed at different portions of the hand key-point recognition device 1000 respectively. The microphone may be further a microphone array or an omnidirectional collection microphone. The speaker is configured to convert the electrical signal from the processor 1001 or the radio frequency circuit 1004 into the sound wave. The speaker may be a conventional film speaker, or may be a piezoelectric ceramic speaker. When the speaker is the piezoelectric ceramic speaker, electrical signals not only can be converted into human-audible sound waves, but also can be converted into human-inaudible sound waves for ranging and other purposes. In some embodiments, the audio circuit 1007 may further include an earphone jack.

The positioning component 1008 is configured to determine a current geographic location of the hand key-point recognition device 1000 through positioning, to implement navigation or a location based service (LBS). The positioning component 1008 may be a positioning component based on the Global Positioning System (GPS) of the United States, China's Beidou Navigation Satellite System (BDS), GLONASS of Russia, or the Galileo system of the European Union.

The power supply 1009 is configured to supply power for various components in the hand key-point recognition device 1000. The power supply 1009 may be an alternating current, a direct current, a disposable battery, or a rechargeable battery. When the power supply 1009 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the hand key-point recognition device 1000 further includes one or more sensors 1010. The one or more sensors 1010 include, but are not limited to: an acceleration sensor 1011, a gyroscope sensor 1012, a pressure sensor 1013, a fingerprint sensor 1014, an optical sensor 1015, and a proximity sensor 1016.

The acceleration sensor 1011 may detect the magnitude of acceleration on three coordinate axes of a coordinate system established by the hand key-point recognition device 1000. For example, the acceleration sensor 1011 may be configured to detect components of gravity acceleration on the three coordinate axes. The processor 1001 may control, according to a gravity acceleration signal collected by the acceleration sensor 1011, the touch display screen 1005 to display the user interface in a transverse view or a longitudinal view. The acceleration sensor 1011 may be further configured to collect game or user motion data.

The gyroscope sensor 1012 may detect a body direction and a rotation angle of the hand key-point recognition device 1000. The gyroscope sensor 1012 may cooperate with the acceleration sensor 1011 to collect a 3D action by the user on the hand key-point recognition device 1000. The processor 1001 may implement the following functions according to the data collected by the gyroscope sensor 1012: motion sensing (such as changing the UI according to a tilt operation of the user), image stabilization during shooting, game control, and inertial navigation.

The pressure sensor 1013 may be disposed on a side frame of the hand key-point recognition device 1000 and/or a lower layer of the touch display screen 1005. When the pressure sensor 1013 is disposed at the side frame of the hand key-point recognition device 1000, a holding signal of the user on the hand key-point recognition device 1000 may be detected, and left/right hand recognition or a quick action may be performed according to the holding signal. When the pressure sensor 1013 is disposed at the lower layer of the touch display screen 1005, an operable control on the UI interface can be controlled according to a pressure operation of the user on the touch display screen 1005. The operable control includes at least one of a button control, a scroll-bar control, an icon control and a menu control.

The fingerprint sensor 1014 is configured to collect a user's fingerprint to identify a user's identity according to the collected fingerprint. When the identity of the user is identified as a trusted identity, the processor 1001 authorizes the user to perform a related sensitive operation. The sensitive operation includes unlocking a screen, viewing encryption information, downloading software, payment, changing settings, and the like. The fingerprint sensor 1014 may be disposed on a front surface, a rear surface, or a side surface of the hand key-point recognition device 1000. When a physical button or a vendor logo is disposed on the hand key-point recognition device 1000, the fingerprint sensor 1014 may be integrated with the physical button or the vendor logo.

The optical sensor 1015 is configured to collect ambient light intensity. In an embodiment, the processor 1001 may control the display brightness of the touch display screen 1005 according to the ambient light intensity collected by the optical sensor 1015. Specifically, when the ambient light intensity is relatively high, the display luminance of the touch display screen 1005 is increased. When the ambient light intensity is relatively low, the display luminance of the touch display screen 1005 is reduced. In another embodiment, the processor 1001 may further dynamically adjust a camera parameter of the camera component 1006 according to the ambient light intensity collected by the optical sensor 1015.

The proximity sensor 1016, also referred to as a distance sensor, is generally disposed on the front surface of the hand key-point recognition device 1000. The proximity sensor 1016 is configured to collect a distance between a front face of the user and a front face of the hand key-point recognition device 1000. In an embodiment, when the proximity sensor 1016 detects that the distance between the user and the front surface of the hand key-point recognition device 1000 becomes smaller, the touch display screen 1005 is controlled by the processor 1001 to switch from a screen-on state to a screen-off state. When the proximity sensor 1016 detects that the distance between the user and the front surface of the hand key-point recognition device 1000 becomes larger, the touch display screen 1005 is controlled by the processor 1001 to switch from the screen-off state to the screen-on state.

A person skilled in the art may understand that the structure shown in FIG. 10 does not constitute a limitation on the hand key-point recognition device 1000, and the hand key-point recognition device may include more components or fewer components than those shown in the figure, or some components may be combined, or a different component deployment may be used.

In an embodiment, a model training device is provided, including a processor and a memory. The memory stores a computer program, and the computer program, when being executed by the processor, causes the processor to perform the steps of the foregoing recognition model training method. Herein, the steps of the recognition model training method may be the steps of the recognition model training method in the foregoing embodiments.

In an embodiment, a computer-readable storage medium is provided, storing a computer program, the computer program, when being executed by a processor, causing the processor to perform the steps of the foregoing recognition model training method. Herein, the steps of the recognition model training method may be the steps of the recognition model training method in the foregoing embodiments.

In an embodiment, a hand key-point recognition device is provided, including a processor and a memory. The memory stores a computer program, and the computer program, when being executed by the processor, causes the processor to perform the steps of the foregoing recognition method. Herein, the steps of the recognition method may be the steps of the recognition method in the foregoing embodiments.

In an embodiment, a computer-readable storage medium is provided, storing a computer program, the computer program, when being executed by a processor, causing the processor to perform the steps of the foregoing recognition method. Herein, the steps of the recognition method may be the steps of the recognition method in the foregoing embodiments.

Optionally, the computer-readable storage medium may include: a read-only memory (ROM), a random access memory (RAM), a solid state drive (SSD), an optional disc, or the like. The RAM may include a resistance random access memory (ReRAM) and a dynamic random access memory (DRAM). The sequence numbers of the foregoing embodiments of the present disclosure are merely for description purpose, and do not indicate the preference among the embodiments.

What is claimed is:

1. A hand key-point recognition model training method for a model training device, comprising:
   converting a sample virtual image into an emulation image by using a Cycle-GAN model, the sample virtual image being an image generated through three-dimensional modeling, the sample virtual image comprising key-point coordinates corresponding to hand key-points, and the emulation image being used for emulating an image acquired in a real scenario;
   extracting a hand image in the emulation image; and
   training a hand key-point recognition model according to the hand image in the emulation image and the key-point coordinates, the hand key-point recognition model being used for outputting hand key-point coordinates of a hand in a real image according to the inputted real image;
   wherein the training the hand key-point recognition model according to the hand image in the emulation image and the key-point coordinates comprises:
   constructing the hand key-point recognition model, the hand key-point recognition model comprising a two-dimensional recognition branch and a three-dimensional recognition branch, the two-dimensional recognition branch comprising a plurality of two-dimensional residual layers and a convolution layer, and the three-dimensional recognition branch comprising a plurality of three-dimensional residual layers and a fully connected layer;
   calculating a two-dimensional recognition loss and a three-dimensional recognition loss of the hand key-point recognition model according to the hand image and the key-point coordinates; and
   reversely training the hand key-point recognition model according to the two-dimensional recognition loss and the three-dimensional recognition loss.

2. The method according to claim 1, wherein before converting the sample virtual image, the method further comprises:
   training the Cycle-GAN model according to a sample real image and the sample virtual image, the sample real image being an image acquired in the real scenario.

3. The method according to claim 2, wherein the training the Cycle-GAN model according to a sample real image and the sample virtual image comprises:
   constructing a first generator and a second generator, the first generator being configured to generate the emulation image, and the second generator being configured to generate a pseudo-virtual image, the pseudo-virtual image being used for emulating a style of the sample virtual image;

constructing a first discriminator and a second discriminator, the first discriminator being configured to discriminate the sample virtual image from the pseudo-virtual image, and the second discriminator being configured to discriminate the sample real image from the emulation image;

constructing the Cycle-GAN model according to the first generator, the second generator, the first discriminator, and the second discriminator;

calculating a loss of the Cycle-GAN model according to the sample real image and the sample virtual image, the loss of the Cycle-GAN model comprising a generator loss, a discriminator loss, and a cycle loss; and reversely training the Cycle-GAN model according to the loss of the Cycle-GAN model.

4. The method according to claim 3, wherein the converting a sample virtual image into an emulation image by using a Cycle-GAN model comprises:

converting the sample virtual image into the emulation image by using the first generator in the Cycle-GAN model.

5. The method according to claim 1, wherein the extracting a hand image in the emulation image comprises:

inputting the emulation image into a gesture segmentation neural network, to output a hand confidence region, the gesture segmentation neural network being obtained by training according to images labeled with hand regions; and extracting the hand image from the emulation image according to the hand confidence region.

6. The method according to claim 5, wherein:

the gesture segmentation neural network comprises n convolution layers and n deconvolution layers, n being an integer greater than or equal to 2; and the inputting the emulation image into a gesture segmentation neural network to output a hand confidence region comprises:

processing the emulation image through the n convolution layers, to obtain an intermediate feature map corresponding to the emulation image;

processing the intermediate feature map through the n deconvolution layers, to obtain a target feature map corresponding to the emulation image;

generating a probabilistic matrix according to the target feature map, the probabilistic matrix being used for representing a probability of each pixel point in the emulation image being the hand; and performing binarization processing on the probabilistic matrix, to output a heatmap corresponding to the hand region, the heatmap being used for indicating the hand confidence region in the emulation image.

7. The method according to claim 6, wherein the processing the intermediate feature map through the n deconvolution layers comprises:

splicing a feature map outputted by an $m^{th}$ deconvolution layer and a feature map outputted by an $(n-m)^{th}$ convolution layer, $1 \le m \le n-1$; and processing a spliced feature map through an $(m+1)^{th}$ deconvolution layer.

8. The method according to claim 1, wherein the plurality of two-dimensional residual layers comprises i two-dimensional residual layers, the plurality of three-dimensional residual layers comprises i three-dimensional residual layers, and first j two-dimensional residual layers being coupled to first j three-dimensional residual layers, $2 \le j \le i-1$, i and j being integers; and wherein the calculating a two-dimensional recognition loss and a three-dimensional recognition loss of the hand key-point recognition model according to the hand image and the key-point coordinates comprises:

inputting the hand image into the two-dimensional recognition branch and the three-dimensional recognition branch respectively;

adding a feature map outputted by a $k^{th}$ two-dimensional residual layer with a feature map outputted by a $k^{th}$ three-dimensional residual layer, $1 \le k \le j-1$;

inputting a feature map obtained after the adding into a $(k+1)^{th}$ two-dimensional residual layer and a $(k+1)^{th}$ three-dimensional residual layer;

processing a feature map outputted by the $j^{th}$ two-dimensional residual layer through $(j+1)^{th}$ to $i^{th}$ two-dimensional residual layers and the convolution layer, to obtain a two-dimensional recognition result;

processing a feature map outputted by the $j^{th}$ three-dimensional residual layer through $(j+1)^{th}$ to $i^{th}$ three-dimensional residual layers and the fully connected layer, to obtain a three-dimensional recognition result;

calculating the two-dimensional recognition loss according to the two-dimensional recognition result and the key-point coordinates; and calculating the three-dimensional recognition loss according to the three-dimensional recognition result and the key-point coordinates.

9. A hand key-point recognition method for a hand key-point recognition device, comprising:

acquiring a real image, the real image comprising a hand image;

extracting the hand image in the real image; and inputting the hand image into a hand key-point recognition model, to obtain hand key-point coordinates, wherein the hand key-point recognition model is obtained by training according to an emulation image and three-dimensional label data of a hand image in the emulation image, the emulation image being generated by a Cycle-GAN model according to a sample virtual image, the Cycle-GAN model being generated according to a sample real image and the sample virtual image, the sample virtual image being an image generated through three-dimensional modeling, and the sample virtual image comprising key-point coordinates corresponding to hand key-points, comprising:

constructing the hand key-point recognition model, the hand key-point recognition model comprising a two-dimensional recognition branch and a three-dimensional recognition branch, the two-dimensional recognition branch comprising a plurality of two-dimensional residual layers and a convolution layer, and the three-dimensional recognition branch comprising a plurality of three-dimensional residual layers and a fully connected layer;

calculating a two-dimensional recognition loss and a three-dimensional recognition loss of the hand key-point recognition model according to the hand image and the key-point coordinates; and reversely training the hand key-point recognition model according to the two-dimensional recognition loss and the three-dimensional recognition loss.

10. The method according to claim 9, wherein:

the real image is acquired by the hand key-point recognition device using an image acquisition device; and the hand image is extracted using a gesture segmentation neural network.

11. A model training device, comprising:
a memory storing computer program instructions; and
a processor coupled to the memory and, when executing the computer program instructions, configured to perform:
converting a sample virtual image into an emulation image by using a Cycle-GAN model, the sample virtual image being an image generated through three-dimensional modeling, the sample virtual image comprising key-point coordinates corresponding to hand key-points, and the emulation image being used for emulating an image acquired in a real scenario;
extracting a hand image in the emulation image; and
training a hand key-point recognition model according to the hand image in the emulation image and the key-point coordinates, the hand key-point recognition model being used for outputting hand key-point coordinates of a hand in a real image according to the inputted real image;
wherein the training the hand key-point recognition model according to the hand image in the emulation image and the key-point coordinates comprises:
constructing the hand key-point recognition model, the hand key-point recognition model comprising a two-dimensional recognition branch and a three-dimensional recognition branch, the two-dimensional recognition branch comprising a plurality of two-dimensional residual layers and a convolution layer, and the three-dimensional recognition branch comprising a plurality of three-dimensional residual layers and a fully connected layer;
calculating a two-dimensional recognition loss and a three-dimensional recognition loss of the hand key-point recognition model according to the hand image and the key-point coordinates; and
reversely training the hand key-point recognition model according to the two-dimensional recognition loss and the three-dimensional recognition loss.

12. The model training device according to claim 11, wherein, before converting the sample virtual image, the processor is further configured to perform:
training the Cycle-GAN model according to a sample real image and the sample virtual image, the sample real image being an image acquired in the real scenario.

13. The model training device according to claim 12, wherein the training the Cycle-GAN model according to a sample real image and the sample virtual image comprises:
constructing a first generator and a second generator, the first generator being configured to generate the emulation image, and the second generator being configured to generate a pseudo-virtual image, the pseudo-virtual image being used for emulating a style of the sample virtual image;
constructing a first discriminator and a second discriminator, the first discriminator being configured to discriminate the sample virtual image from the pseudo-virtual image, and the second discriminator being configured to discriminate the sample real image from the emulation image;
constructing the Cycle-GAN model according to the first generator, the second generator, the first discriminator, and the second discriminator;
calculating a loss of the Cycle-GAN model according to the sample real image and the sample virtual image, the loss of the Cycle-GAN model comprising a generator loss, a discriminator loss, and a cycle loss; and
reversely training the Cycle-GAN model according to the loss of the Cycle-GAN model.

14. The model training device according to claim 13, wherein the converting a sample virtual image into an emulation image by using a Cycle-GAN model comprises:
converting the sample virtual image into the emulation image by using the first generator in the Cycle-GAN model.

15. The model training device according to claim 11, wherein the extracting a hand image in the emulation image comprises:
inputting the emulation image into a gesture segmentation neural network, to output a hand confidence region, the gesture segmentation neural network being obtained by training according to images labeled with hand regions; and
extracting the hand image from the emulation image according to the hand confidence region.

16. The model training device according to claim 15, wherein:
the gesture segmentation neural network comprises n convolution layers and n deconvolution layers, n being an integer greater than or equal to 2; and
the inputting the emulation image into a gesture segmentation neural network to output a hand confidence region comprises:
processing the emulation image through the n convolution layers, to obtain an intermediate feature map corresponding to the emulation image;
processing the intermediate feature map through the n deconvolution layers, to obtain a target feature map corresponding to the emulation image;
generating a probabilistic matrix according to the target feature map, the probabilistic matrix being used for representing a probability of each pixel point in the emulation image being the hand; and
performing binarization processing on the probabilistic matrix, to output a heatmap corresponding to the hand region, the heatmap being used for indicating the hand confidence region in the emulation image.

17. The model training device according to claim 16, wherein the processing the intermediate feature map through the n deconvolution layers comprises:
splicing a feature map outputted by an $m^{th}$ deconvolution layer and a feature map outputted by an $(n-m)^{th}$ convolution layer, $1 \leq m \leq n-1$; and
processing a spliced feature map through an $(m+1)^{th}$ deconvolution layer.

18. The model training device according to claim 17, wherein the plurality of two-dimensional residual layers comprises i two-dimensional residual layers, the plurality of three-dimensional residual layers comprises i three-dimensional residual layers, and first j two-dimensional residual layers being coupled to first j three-dimensional residual layers, $2 \leq j \leq i-1$, i and j being integers; and wherein the calculating a two-dimensional recognition loss and a three-dimensional recognition loss of the hand key-point recognition model according to the hand image and the key-point coordinates comprises:
inputting the hand image into the two-dimensional recognition branch and the three-dimensional recognition branch respectively;
adding a feature map outputted by a $k^{th}$ two-dimensional residual layer with a feature map outputted by a $k^{th}$ three-dimensional residual layer, $1 \leq k \leq j-1$;

inputting a feature map obtained after the adding into a $(k+1)^{th}$ two-dimensional residual layer and a $(k+1)^{th}$ three-dimensional residual layer;

processing a feature map outputted by the $j^{th}$ two-dimensional residual layer through $(j+1)^{th}$ to $i^{th}$ two-dimensional residual layers and the convolution layer, to obtain a two-dimensional recognition result;

processing a feature map outputted by the $j^{th}$ three-dimensional residual layer through $(j+1)^{th}$ to $i^{th}$ three-dimensional residual layers and the fully connected layer, to obtain a three-dimensional recognition result;

calculating the two-dimensional recognition loss according to the two-dimensional recognition result and the key-point coordinates; and calculating the three-dimensional recognition loss according to the three-dimensional recognition result and the key-point coordinates.

19. The model training device according to claim 13, further comprises constructing a loss function of the Cycle-GAN model according to the generator loss, the discriminator loss, and the cycle loss.

20. The model training device according to claim 19, wherein in the loss function, a multiplication factor of the cycle loss is greater than a multiplication factor of the discriminator loss.

* * * * *